US006968317B1

(12) United States Patent
Wallace et al.

(10) Patent No.: US 6,968,317 B1
(45) Date of Patent: Nov. 22, 2005

(54) METHOD AND APPARATUS FOR NEW ACCOUNTS PROGRAM

(75) Inventors: Colleen Wallace, Walnut Creek, CA (US); Harry Friman, Novato, CA (US); Gee Kin Chou, San Francisco, CA (US); Beth Devin, Lafayette, CA (US); Janet Chapman, Sausalito, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 425 days.

(21) Appl. No.: 09/643,021

(22) Filed: Aug. 21, 2000

Related U.S. Application Data

(60) Provisional application No. 60/200,612, filed on Apr. 28, 2000.

(51) Int. Cl.[7] .............................................. G06F 17/60
(52) U.S. Cl. .......................... 705/36; 705/37; 705/39; 705/44; 380/24
(58) Field of Search .............................. 705/1, 30, 34, 705/36, 40, 44; 380/24

(56) References Cited

U.S. PATENT DOCUMENTS

| | | |
|---|---|---|
| 3,741,118 A | 6/1973 | Carley .................... 101/451 |
| 3,800,699 A | 4/1974 | Carley .................... 101/147 |
| 4,027,142 A | 5/1977 | Paup et al. ............... 235/61.9 |
| 4,321,672 A | 3/1982 | Braun et al. .............. 364/408 |
| 4,404,649 A | 9/1983 | Nunley et al. ............. 364/900 |
| 4,491,725 A | 1/1985 | Pritchard .................. 235/375 |
| 4,523,330 A | 6/1985 | Cain ......................... 382/7 |
| 4,654,793 A | 3/1987 | Elrod ....................... 364/401 |
| 4,672,377 A | 6/1987 | Murphy et al. .......... 340/825.34 |
| 4,757,187 A | 7/1988 | Millet ...................... 235/432 |
| 4,791,281 A | 12/1988 | Johnsen et al. .......... 235/383 |
| 4,981,370 A | 1/1991 | Dziewit et al. ............ 380/25 |
| 5,068,742 A | 11/1991 | Oshikoshi et al. ........ 358/296 |
| 5,079,731 A | 1/1992 | Miller et al. ............. 364/578 |
| 5,099,340 A | 3/1992 | Kamada et al. .......... 358/403 |
| 5,103,476 A * | 4/1992 | Waite et al. ............... 705/59 |
| 5,106,719 A | 4/1992 | Oshikoshi et al. ........ 430/203 |
| 5,191,525 A | 3/1993 | LeBrun et al. ........... 364/419 |
| 5,195,133 A | 3/1993 | Kapp et al. ................ 380/9 |

(Continued)

FOREIGN PATENT DOCUMENTS

EP          0 313 085 B1    10/1988    .......... B42D 15/00

(Continued)

OTHER PUBLICATIONS

The Complete Guide to Investing With Your PC,9online investment resource)(includes related articles on the qualit of INternet stock tips, and avoiding investment scams) (Internet/Web/Online Service Information) Gerlach, Douglas, PC World, vol.: 16, Number.*

(Continued)

Primary Examiner—James P. Trammell
Assistant Examiner—Daniel L. Greene
(74) Attorney, Agent, or Firm—Stallman & Pollock LLP

(57) ABSTRACT

A method for opening an on-line brokerage account includes the steps of opening an on-line brokerage account for a user based on account information received from the user, the on-line brokerage account having one or more restrictions, generating an application based on the account information; requesting that the user submit required information with the application within a predetermined time to remove the one or more restrictions from the on-line brokerage account, and removing said one or more restrictions from the on-line brokerage account when the application including the required information is received within the predetermined time.

17 Claims, 20 Drawing Sheets

U.S. PATENT DOCUMENTS

| | | | |
|---|---|---|---|
| 5,249,687 A | 10/1993 | Rosenbaum et al. | 209/3 |
| 5,315,504 A | 5/1994 | Lemble | 364/400 |
| 5,324,922 A | 6/1994 | Roberts | 235/375 |
| 5,367,573 A | 11/1994 | Quimby | 380/25 |
| 5,367,619 A | 11/1994 | Dipaolo et al. | 395/149 |
| 5,404,294 A | 4/1995 | Karnik | 364/419.1 |
| 5,450,537 A | 9/1995 | Hirai et al. | 395/149 |
| 5,459,854 A | 10/1995 | Sherer et al. | 395/500 |
| 5,534,855 A | 7/1996 | Shockley et al. | 340/825 |
| 5,541,993 A | 7/1996 | Fan et al. | 380/18 |
| 5,606,609 A | 2/1997 | Houser et al. | 380/4 |
| 5,640,501 A | 6/1997 | Turpin | 395/768 |
| 5,640,577 A | 6/1997 | Scharmer | 395/768 |
| 5,652,794 A | 7/1997 | Lepetit et al. | 380/18 |
| 5,671,282 A | 9/1997 | Wolff et al. | 380/25 |
| 5,673,320 A | 9/1997 | Ray et al. | 283/17 |
| 5,680,615 A | 10/1997 | Marline et al. | 395/614 |
| 5,689,567 A | 11/1997 | Miyauchi | 380/25 |
| 5,692,206 A | 11/1997 | Shirley et al. | 395/793 |
| 5,699,527 A | 12/1997 | Davidson | 705/38 |
| 5,704,029 A | 12/1997 | Wright, Jr. | 345/173 |
| 5,819,062 A | 10/1998 | Srikantappa | 395/500 |
| 5,822,739 A | 10/1998 | Kara | 705/410 |
| 5,825,003 A | 10/1998 | Jennings et al. | 235/379 |
| 5,832,100 A | 11/1998 | Lawton et al. | 382/100 |
| 5,832,227 A | 11/1998 | Anderson et al. | 395/200.54 |
| 5,835,724 A | 11/1998 | Smith | 707/501.1 |
| 5,842,185 A | 11/1998 | Chancey et al. | 705/40 |
| 5,842,195 A | 11/1998 | Peters et al. | 707/1 |
| 5,845,070 A | 12/1998 | Ikudome | 395/187.01 |
| 5,845,256 A | 12/1998 | Pescitelli et al. | 705/4 |
| 5,866,889 A | 2/1999 | Weiss et al. | 235/379 |
| 5,870,721 A | 2/1999 | Norris | 705/35 |
| 5,872,640 A | 2/1999 | Cohen et al. | 358/434 |
| 5,878,403 A | 3/1999 | DeFrancesco et al. | 705/35 |
| 5,887,271 A | 3/1999 | Powell | 705/14 |
| 5,938,726 A | 8/1999 | Reber et al. | 395/200 |
| 5,956,034 A | 9/1999 | Sachs et al. | 345/350 |
| 5,978,773 A | 11/1999 | Hudetz et al. | 705/23 |
| 5,988,897 A | 11/1999 | Pierce et al. | 400/61 |
| 6,021,492 A * | 2/2000 | May | 713/200 |
| 6,058,373 A | 5/2000 | Blinn et al. | 705/22 |
| 6,061,516 A | 5/2000 | Yoshikawa et al. | 717/109 |
| 6,131,810 A | 10/2000 | Weiss et al. | 235/379 |
| 6,189,009 B1 | 2/2001 | Stratigos et al. | 707/10 |
| 6,216,112 B1 * | 4/2001 | Fuller et al. | 705/14 |
| 6,220,509 B1 | 4/2001 | Byford | 235/375 |
| 6,223,983 B1 | 5/2001 | Kjonaas et al. | 235/379 |
| 6,345,278 B1 * | 2/2002 | Hitchcock et al. | 707/100 |
| 6,354,490 B1 | 3/2002 | Weiss et al. | 235/379 |
| 6,725,220 B2 | 4/2004 | Stratigos et al. | 707/10 |
| 2001/0056387 A1 * | 12/2001 | Magary | |
| 2002/0007335 A1 * | 1/2002 | Millard | |

FOREIGN PATENT DOCUMENTS

| | | | | |
|---|---|---|---|---|
| EP | 0 483 664 B1 | 10/1991 | | G06F 17/20 |
| FR | 2 593 938 | 8/1987 | | G03F 3/08 |
| GB | 2 178 921 A | 2/1987 | | G06K 3/00 |
| JP | 58-85670 | 5/1983 | | H04N 1/22 |
| JP | 59-132062 | 7/1984 | | G06F 15/20 |
| JP | 60-57479 | 4/1985 | | G06K 15/22 |
| JP | 61-46553 | 3/1986 | | G06F 15/20 |
| JP | 61-272747 | 12/1986 | | G03F 5/00 |
| JP | 62-34454 | 2/1987 | | H04N 1/00 |
| JP | 63-244165 | 10/1988 | | G06F 15/16 |
| JP | 63-247866 | 10/1988 | | G06F 15/30 |
| JP | 63-268080 | 11/1988 | | G06K 9/03 |
| JP | 63-316290 | 12/1988 | | G06K 19/00 |
| JP | 64-38870 | 2/1989 | | G06F 15/22 |
| JP | 1-206098 | 8/1989 | | B42D 15/02 |
| JP | 2-244377 | 9/1990 | | G06F 15/21 |
| JP | 2-278423 | 11/1990 | | G06F 5/00 |
| JP | 2-291767 | 12/1990 | | H04N 1/32 |
| JP | 2-311982 | 12/1990 | | G07B 1/00 |
| JP | 4-56474 | 2/1992 | | H04N 1/387 |
| JP | 4-299451 | 10/1992 | | G06F 15/20 |
| JP | 5-3490 | 1/1993 | | H04L 12/54 |
| JP | 5-35843 | 2/1993 | | G06F 15/62 |
| JP | 5-81390 | 4/1993 | | G06F 15/62 |
| JP | 5-81468 | 4/1993 | | G06K 9/20 |
| JP | 5-92680 | 4/1993 | | B42D 11/00 |
| JP | 5-101113 | 4/1993 | | G06F 15/40 |
| JP | 5-250383 | 9/1993 | | G06F 15/21 |
| JP | 5-334330 | 12/1993 | | G06F 15/30 |
| JP | 5-346924 | 12/1993 | | G06F 15/21 |
| JP | 6-28372 | 2/1994 | | G06F 15/21 |
| JP | 6-60233 | 3/1994 | | G06K 17/00 |
| JP | 6-195358 | 7/1994 | | G06F 15/22 |
| JP | 6-282708 | 10/1994 | | G07B 1/00 |
| JP | 6-282709 | 10/1994 | | G07B 1/00 |
| JP | 6-325058 | 11/1994 | | G06F 15/22 |
| JP | 7-89261 | 4/1995 | | B42D 11/00 |
| JP | 7-110788 | 4/1995 | | G06F 12/08 |
| JP | 7-192148 | 7/1995 | | G07B 1/00 |
| JP | 8-20149 | 1/1996 | | B41J 21/00 |
| JP | 8-83357 | 3/1996 | | G07B 1/00 |
| JP | 8-180210 | 7/1996 | | G07B 1/00 |
| JP | 8-287153 | 11/1996 | | G06F 17/60 |
| JP | 9-54839 | 2/1997 | | G07B 1/00 |
| JP | 9-200506 | 7/1997 | | H04N 1/40 |
| JP | 9-231290 | 9/1997 | | G06F 19/00 |
| JP | 9-247317 | 9/1997 | | H04N 1/00 |
| JP | 10-27203 | 1/1998 | | G06F 17/60 |
| JP | 10-91701 | 4/1998 | | G06F 19/00 |
| JP | 10-207753 | 8/1998 | | G06F 12/00 |
| JP | 10-254949 | 9/1998 | | G06F 17/60 |
| JP | 10-254973 | 9/1998 | | G06F 19/00 |
| JP | 10-275179 | 10/1998 | | G06F 17/60 |
| JP | 11-25296 | 1/1999 | | G07B 1/00 |
| JP | 11-39165 | 2/1999 | | G06F 9/445 |
| JP | 11-39411 | 2/1999 | | G06F 19/00 |
| JP | 11-139047 | 5/1999 | | B42D 15/10 |
| JP | 11-175783 | 7/1999 | | G07B 15/00 |
| JP | 11-272807 | 10/1999 | | G06K 17/00 |
| JP | 11-331807 | 11/1999 | | H04N 7/173 |
| JP | 2000-6550 | 1/2000 | | B42D 11/00 |
| JP | 2000-132466 | 5/2000 | | G06F 13/00 |
| JP | 2000-207187 | 7/2000 | | G06F 9/06 |
| JP | 2000-235522 | 8/2000 | | G06F 12/14 |
| JP | 2000-259863 | 9/2000 | | G07B 1/00 |
| JP | 2000-263976 | 9/2000 | | B42D 15/10 |
| JP | 2000-276618 | 10/2000 | | G07B 5/04 |
| JP | 2001-22741 | 1/2001 | | G06F 17/21 |
| WO | WO 98/31114 | 7/1998 | | H04H 9/00 |
| WO | WO 00/10068 | 2/2000 | | |
| WO | WO 00/31976 | 6/2000 | | H04N 7/18 |
| WO | WO 00/39958 | 7/2000 | | H04L 9/32 |
| WO | WO 01/09763 A1 | 2/2001 | | G06F 17/30 |
| WO | WO 01/15382 A1 | 3/2001 | | H04L 9/32 |

OTHER PUBLICATIONS

SNAP—Ira Procedures (Draft), *Charles Schwab & Co. Inc.*, process documentation, 8 pages in length (Jun. 1999).

SNAPWeb PROCEDURES (Streamlining the New Application Process), *Charles Schwab & Co. Inc.*, process documentation, 9 pages in length (Oct. 1999).

A.B. Dayao et al., "SuperForms: A Security-Enhanced Smart Electronic Form Management System," *Global Telecommunications Conference, 1990, an Exhibition 'Communications: Connecting the Future,' Globecom '90*, pp. 1079-1083 (1990).

A. Herzberg et al., "Surf'N'Sign: Client signatures on Web documents," *IBM Systems Journal*, vol. 37, No. 1 (1998), pp. 61-71.

D.E. Coe et al., "Developing and Deploying a Corporate-Wide Digital Signature Capability," *SIG Security Audit & Control Review*, vol. 13, No. 3, Jul. 1995, pp. 5-8.

B. Wright, "Signing Tax Returns with a Digital Pen," *SIG Security Audit & Control Review*, Vol. 14, No. 4, Oct. 1996, pp. 17-20.

B. Wright, "Legal Signatures and Proof in Electronic Commerce," *The Second USENIX Workshop on Electronic Commerce Proceedings (Oakland, California)*, Nov. 18-21, 1996, pp. 67-75.

L. O'Gorman et al., "Secure Identification Documents Via Pattern Recognition and Public-Key Cryptography," *IEEE Transactions on Pattern Analysis and Machine Intelligence*, vol. 20, No. 10, Oct. 1998, pp. 1097-1102.

N. Komatsu et al., "A Proposal on Digital Watermark in Document Image Communication and Its Application to Realizing a Signature," *Electronics and Communications in Japan*, Part I, Vol. 73, No. 5 (1990), pp. 22-33.

E.F. Brickell et al., "Interactive Identification and Digital Signatures," *AT&T Technical Journal*, Nov./Dec. 1991, pp. 73-86.

S. B. Yao et al., "FORMANAGER: An Office Forms Management System," *ACM Transactions on Office Information Systems*, Vol. 2, No. 3, Jul. 1984, pp. 235-256.

Released by EMAP Media Ltd., "Friendly system based on e-mail (BeyondMail Professional from Banyan Systems) (Lab Test: Workflow Software) (Software Review) (Evaluation)," *PC User*, No. 257, Apr. 19, 1995, 3 pages in length.

Anonymous, "Implementations show technology is information," *Employee Benefit Plan Review, New York*, Vol. 49, Issue 8, Feb. 1995, 2 pages in length.

D. Bank, "Social Security Plans To Test W-2 Forms Filed on the Internet --- Project With Pitney Bowes Will Involve Small Firms, Use Digital 'Signatures'," *The Wall Street Journal*, Oct. 25, 1996, 2 pages in length.

FEDEX Ship Software, Copyright 1994-1998, Screen Shots (1994-1998), 18 pages in length.

M. Moeller, "JetForm propels Web forms; Server gains WWW links; Filler gets HTTP support," *PC Week*, Vol. 12, No. 44, Nov. 6, 1995, 1 page in length.

L. Greenemeier, Alliance adds E-forms to ASW. (International Business Systems—United States incorporating JetForm's e-form technology into its ASW software), *MIDRANGE Systems*, Vol. 11, No. 5, Apr. 13, 1998, 1 page in length.

D. Callaghan, "JetForm, Zebra form barcode team. (JetForm Corp., Zebra Technologies alliance to develop barcode printing products)," *MIDRANGE Systems*, Vol. 10, No. 20, Dec. 12, 1997), 1 page in length.

Product Announcement, "JetForm FormFlow 99 allows reusable forms," *Computing Canada*, Oct. 26, 1998, 1 page in length.

M. Godby, "Electronic commerce on the Web—Better forms mean better functions," *Inform*, Vol. 11, No. 10, Nov. 1997, 2 pages in length.

S.A. Caswell, "Mail message that cut red tape," *Datamation*, Vol. 36, No. 20, Oct. 15, 1990, 3 pages in length.

DATEK Online Application Form, Apr. 1999, Screen shots, 6 pages in length.

In re U.S. Appl. No. 09/566,526, entitled System and Method for Integrating Paper-Based Business Documents with Computer-Readable Data Entered Via a Computer Network, filed May 8, 2000, by W.N. Stratigos et al., 19 pages in length.

* cited by examiner

| Account Identifier 301 | User Name 302 | Home Address 303 | Business Address 304 | Contact Number 305 | Date of Birth 306 | Alias 307 | E-mail Address 308 | Driver's License 309 | Country of Citizenship 310 | Country of Legal Residence 311 |
|---|---|---|---|---|---|---|---|---|---|---|
| T-1111 | Lulubelle Queeg | 123 Anystreet Anytown, CA 12345 | 987 Anystreet Anytown, CA 12345 | 555-555-1234 | 1/1/63 | Lulu | lulu@link.com | CA 12345 | USA | N/A |
| T-2222 | Jim Smith | 234 Anystreet Anytown, CA 12345 | 876 Anystreet Anytown, CA 12345 | 555-555-2345 | 4/5/78 | jt | jsmith@aanylink.com | CA 23456 | Germany | USA |
| T-3333 | John Doe | 345 Anystreet Anytown, CA 12345 | 765 Anystreet Anytown, CA 12345 | 555-555-3456 | 9/8/77 | N/A | jdoe@anylink.com | CA 34567 | USA | N/A |

FIG. 3A

| Account Number 241 | Event Identifier 242 | Event Name 243 | Event Start Date 244 | Event End Date 244 | Event Status 245 | Event Action 246 |
|---|---|---|---|---|---|---|
| 123456 | 987 | series 8 review | 5/5/00 | 5/5/00 | open | pend |
|  | 988 | series 8 approved | 5/5/00 | 5/5/00 | open | pend |

FIG. 4

| Password 312 | Social Security Number 313 | Employment Status 316 | Occupation 317 | Employer 318 | Company Ownership 319 | Security Firm Affiliation 320 | Marital Status 321 | Dependents 322 | Investment Knowledge 325 | Investment Experience 326 |
|---|---|---|---|---|---|---|---|---|---|---|
| abcdef | 555-55-5555 | employed | teacher | Any School 124 Any Street Anytown, CA 12345 | none | none | single | none | medium | medium |
| 24680 | 444-44-4444 | employed | doctor | Any Hospital 124 Any Street Anytown, CA 12345 | none | none | married | none | medium | medium |
| 13579 | 333-33-3333 | employed | engineer | Any School 123 Any Street Anytown, CA 12345 | none | none | married | 1 | none | none |

FIG. 3B

| Tax Bracket 327 | Income 328 | Net Worth 329 | Investment Objective 330 | Type of Fund 332 | Web Account Access 333 | Account Funding 334 | Electronic Funds Transfer 335 |
|---|---|---|---|---|---|---|---|
| 22% | $30,000 | $10,000 | growth | stock | lulu@link.com | 5/5/99 $3000 cash | AnyBank Acct. No. 555-abc-654 15th of each month |
| 29% | $60,000 | $200,000 | balance | money market | jsmith@aanylink.com | 2/15/99 $2000 cash | none |
| 39% | $70,000 | $75,000 | growth | stock | jdoe@anylink.com | 4/1/99 $3000 transfer assets | none |

FIG. 3C

Although Only Cash Accounts Are Part Of This
Offering, Investors Still Cannot Fund Or Trade Until
The Signed Application Has Been Received

| Event<br>Investor capability | • Series 8 approved<br>• Acct is opened<br>• Signed application not yet received | • Signed application has been received and processed | • Acct has been opened for 28 days<br>• Signed application still has not been received |
|---|---|---|---|
| Access to customer website to do research | √ | √ | X |
| Fund the acct | X | √ | X |
| Purchase or sell securities | X | √ | X |

Legend: √ = capable  X = not capable

FIG. 9

PROCESSING FLOW

- System edits ensure that investors provide all necessary information before submitting the application
  - reduce need for follow-up

- Automation will capture all the required information at the point of entry

- System controls are in place to prevent investors from funding or trading until the signed application is received

- Investor just has to sign and return the pre-filled form to activate the account for funding, trading, and real time quotes
  - higher probability that paperwork will be returned and account activated because process is initiated by investor

- Authority to activate the accounts is strictly controlled

- Investor is reminded after 15 days and again after another 6 days if signed application has not been received

- System will close accounts and notify investors when signed application has not been received within 28 days

- Daily reports are generated to monitor exceptions

FIG. 12

Series 8 Review

- sorting capability for Series 8 review window
- improved error handling capability
- web-enabling feature
- addition to client display of CICS Identification to client to id actual reviewer

FIG. 13

OMNI CLIENT

One Embodiment of
Present Invention

- "P" - Phone Initial Contact Code

- "P" Restrict Account

- New Fields
  - Occupation
  - IRA Credit Card #/Expiration Date
  - IRA Beneficiary Share %/Relationship

- Business Rule Changes effecting
  - Application Signed Data
  - Number of Dependents
  - Marital Sttatus Alternate Embodiment of
Present Invention

- Web-enabling feature in OMNI 3.0

- New Fields for Schwab One and Brokerage accounts

FIG. 14

OMNI SERVICES

One Embodiment of
Present Invention

- Security on Account Open/Update

- Event Table
  - The Event Table is a log of activity performed against records.

- - Add Customer
  - Add Account

- Restrict Opening to IRA

- Middleware DLLs
  - Clone Existing

Alternate Embodiment of
Present Invention

- Allow For Addditional Form Types with "P" Contact Code.
  - General Brokerage

- Middleware DLLs
  - Clone Existing

FIG. 15

DATABASE APPLICATION CHANGES

| One Embodiment of Present Invention | Alternate Embodiment of Present Invention |
|---|---|
| • ATRN<br>  - Transaction to list last 6 months history of transactions<br>• Funds Deposit<br>  - Used to deposit funds into accounts<br>• MoneyLink/Journaling<br>  - Enables money transfers between or to Bank Accounts<br>• Mutual Funds TOA<br>  - Mutual Funds transfers on accounts | • No Other Changes Anticipated |

FIG. 16

EXTRACT PROGRAM

| One Embodiment of Present Invention | Alternate Embodiment of Present Invention |
|---|---|
| • Application Wrapper<br>  Extract Accounts From Event Table<br>  Retrieve Customer and Account Information<br>• Business Services (COBOL)<br>  Read Customer Data<br>  Read Account Data | • Application Wrapper to Handle Schwab One Accounts<br>• Application Wrapper to Handle General Brokerage Accounts |

FIG. 17

METHOD AND APPARATUS FOR NEW ACCOUNTS PROGRAM

PRIORITY CLAIM UNDER 35 USC § 119

This application claims priority to provisional application No. 60/200,612 entitled Method and Apparatus for New Accounts Program filed on Apr. 28, 2000 under 35 USC § 119.

BACKGROUND OF THE INVENTION

1. Field of the Invention

The present invention relates generally to on-line trading and, more particularly, to opening a new on-line brokerage accounts for on-line trading.

2. Discussion of the Related Art

To open a conventional brokerage account, a user is required to obtain a paper copy of a brokerage account application, complete the application by handwriting or typing the information into the fields of the application, and sign and mail the completed application to the brokerage firm for processing. This process is very time consuming. Indeed, it can be at least one week before the brokerage firm receives the account application. During this time, prospective customers are unable to access the tools, such as on-line research, available at the web site of the brokerage firm until their application is processed and approved. This waiting period can be frustrating for prospective customers.

To expedite the process of opening new brokerage accounts, some brokerage firms have established websites from which prospective customers can download and/or print an account application. However, the prospective customers are still required to complete the application by handwriting or typing the information and then mail the completed application to the brokerage firm for processing. The process is still very time consuming and fails to take advantage of web-based processes which can speed up the account application process.

Currently opening an on-line brokerage account is a slow process which causes the prospective customers to sit idle while waiting for a notification that their account has been approved. Thus, a need exists for a method and apparatus to facilitate opening of on-line brokerage accounts.

SUMMARY OF THE INVENTION

In accordance with one embodiment of the present invention, a method for opening an on-line brokerage account includes the steps of opening an on-line brokerage account for a user based on account information received from the user, the on-line brokerage account having one or more restrictions, generating a formal application based on the account information; requesting that the user submit required information with the formal application within a predetermined time to remove the one or more restrictions from the on-line brokerage account, and removing the one or more restrictions from the on-line brokerage account when the formal application including the required information is received within the predetermined time.

As a result, the present invention expedites the process of opening new brokerage accounts. A server receives a user's electronic brokerage account application on-line, and immediately assigns and sends the user an account identifier. This account identifier identifies a provisional restricted brokerage account having one or more restrictions, which is available to the user until the user's information in the brokerage account application is verified and processed. During this time, the user is able to use the account identifier to access tools and services available on the brokerage firm's central server via the Internet. At this point, the user has access to the secure website of the brokerage firm, but is prevented from performing certain activities, such as trading securities.

In one embodiment, the user can print the electronic brokerage account application form, sign it, and send it to the brokerage firm with funding or instructions for funding the account.

In an alternate embodiment, the brokerage firm processes the user's electronic account application and returns it to the user for a signature and for funding. The user then signs and returns the application for further processing.

In yet another alternate embodiment, the electronic account application includes a user's electronic signature and click through agreement, enabling the user to complete the entire application on-line. The on-line brokerage account can be opened without the user mailing in an account application. When the application process is complete, the user is notified that the account has been fully activated and that the restrictions on the account have been removed. Thus, for example, the user can begin trading securities. With such a system, the user is able to complete and send an application on-line, and shortly thereafter obtain access to many, if not all, of the brokerage firm's on-line services.

BRIEF DESCRIPTION OF THE DRAWINGS

FIGS. 3A, 3B and 3C collectively provide a tabular illustration of an account database according to an example embodiment of the present invention.

FIG. 4 is a tabular illustration of an event database according to an example embodiment of the present invention.

FIG. 9 is a summary of rights granted in the embodiments of the present invention exemplified in FIGS. 7 and 8.

FIG. 12 is a chart identifying the features of an exemplary embodiment of the present invention.

FIG. 13 is a chart identifying the features of an exemplary embodiment of the series 8 review in an exemplary embodiment of the present invention.

FIGS. 14 and 15 list features and/or fields which are present in the Release 1 or Release 2 versions of an exemplary embodiment of present invention in the OMNI functional block.

FIG. 16 identifies features implemented in the DB2 application in connection with an exemplary embodiment of the present invention.

FIG. 17 identifies some of the operations which occur in the Extract function shown in FIG. 10, in the Release 1 or Release 2 versions.

DETAILED DESCRIPTION OF THE PREFERRED EMBODIMENTS

The present invention may be embodied as one or more computer programs developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers.

Figure 1:
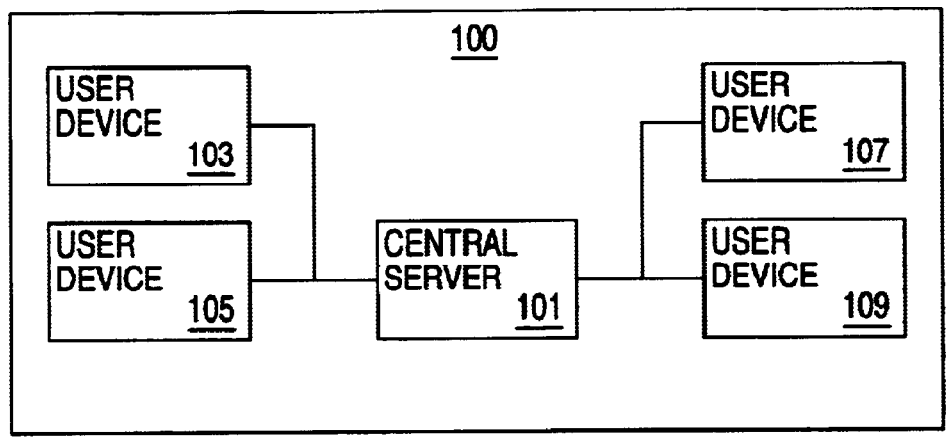
FIG. 1 is a block diagram of an overview of an on-line brokerage system according to example embodiments of the present invention.

An example of a system embodying the present invention is illustrated in FIG. 1. A electronic trading system 100, according to the present invention includes a central server 101 in communication with one or more client terminals, such as user devices 103, 105, 107, 109 (four are shown in FIG. 1 for illustrative purposes only, more or fewer devices can be supported). The user devices 103, 105, 107, 109 and central server 101 are interconnected by a communication network.

The central server 101 can be embodied as a system controller, a dedicated hardware circuit, a programmed general purpose computer, or any other functionally equivalent configurable electronic, mechanical, or electro-mechanical-device. The user devices 103, 105, 107, 109 can likewise be embodied as dedicated hardware circuits, programmed general purpose computers, personal computers, televisions, telephones, pagers, palmtop computers, or any other functionally equivalent configurable electronic, mechanical, or electro-mechanical devices. The devices can be in communication with the central server 101 via a network such as a Local Area Network (LAN), a Wide Area Network (WAN), a Public Switched Phone Network (PSTN), a cable network, or an Internet Protocol (IP) network, such as an intranet, extranet, or internet. Communication may also be provided by dedicated data lines, cellular, Personal Communication Systems ("PCS"), microwave or satellite networks. Using these components, the present invention provides a method, apparatus and system for on-line trading.

In one embodiment, central server 101 includes a web server for an Internet environment in communication with a host server, which is configured as a program-controlled mainframe computer that includes integrated user information. However, other computers, including mini computers or smaller computers, may also take the role of host server. The two servers communicate using software components present on servers including applications and middleware. Client applications make requests of databases associated with the servers by way of the middleware. Requests typically comprise logical connection (login) requests, query requests, etc. and may initiate physical connection requests. A physical connection request is a request for a network connection between the two servers.

Figure 2:
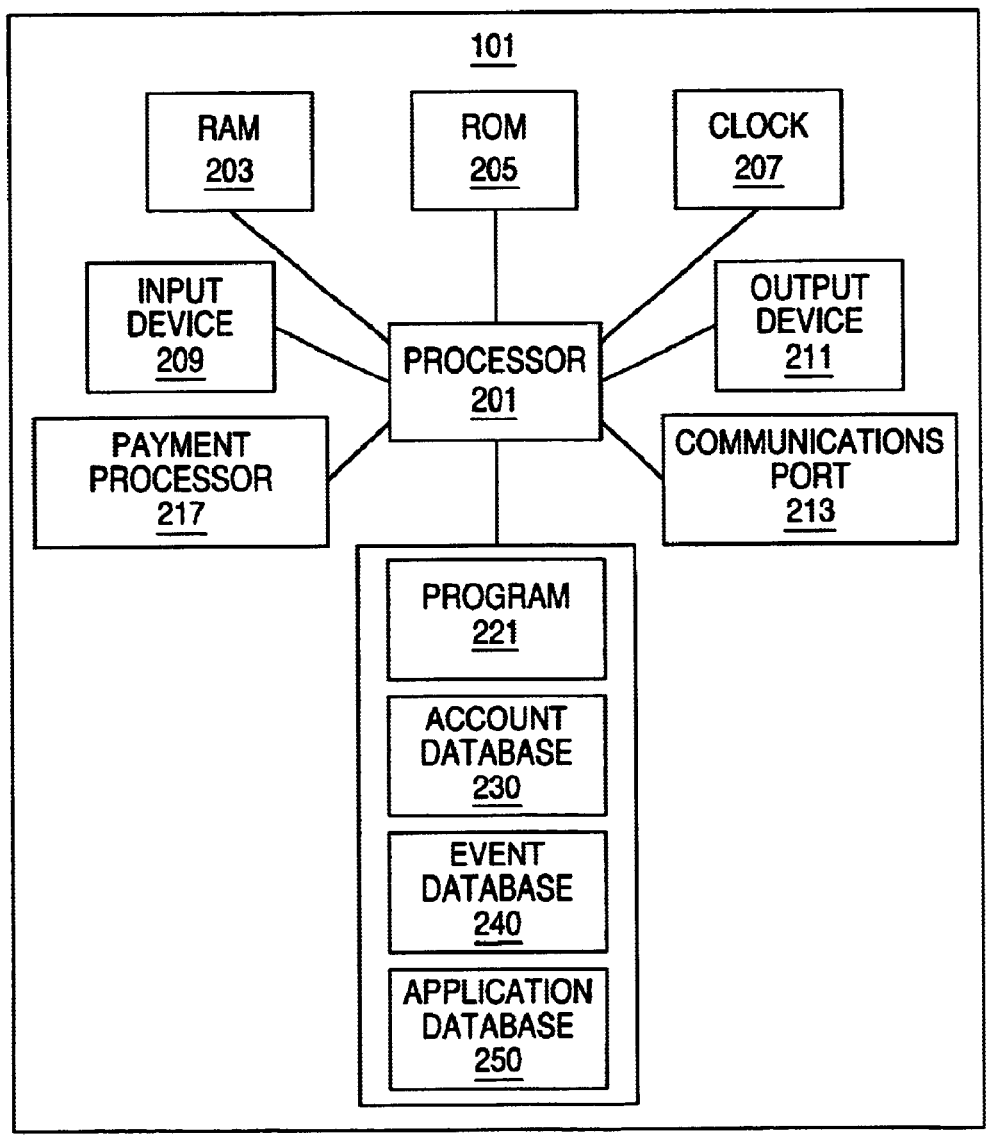
FIG. 2 is a block diagram of an on-line brokerage server according to an example embodiment of the present invention.

Referring now to FIG. 2, an embodiment of central server 101 is illustrated. Central server 101 includes a processor 201, RAM (Random Access Memory) 203, ROM (Read Only Memory) 205, a clock 207, an input device 209, an output device 211, a communications port 213 and a data storage device 220. In an alternate embodiment, the central server 101 is further in communication with a payment processor 217 that may include one or more conventional microprocessors, supporting the transfer and exchange of payments attendant to the method and the apparatus of the present invention. Payment processor 217 can also be configured as part of processor 201. Processing of financial account transactions by payment processor 217 may be supported with commercially available software. The central server 101 may use this payment processor 217 in order to credit or debit a financial account of the user.

A conventional personal computer or workstation with sufficient memory and processing capability may be used as the central server 101. In a preferred embodiment, the central server 101 includes a web server for an Internet environment, transmitting and receiving data related to financial account information generated by users and is capable of high volume transaction processing, performing a significant number of mathematical calculations in processing communications and database searches. A Pentium microprocessor such as the PIII, manufactured by Intel Corporation may be used for processor 201. Equivalent processors are available from Motorola, Inc. or Sun Microsystems, Inc. Processor 201 may comprise one or more microprocessors.

The input device 209 may comprise one or more input devices 209, such as or in conjunction with a keyboard, mouse, touch screen or conventional voice recognition software package, and allows traders, to input information regarding their trades. Alternatively, the input devices 209 may be telephone keypads for use with IVRU technology in telephone systems.

The output device 211 may comprise one or more output devices 211 in the form of video displays, electro-luminescent arrays, liquid crystal display panels, printers, or functionally equivalent devices, and may be operable to display information regarding the status of a trade being computed in the processor 201.

The clock 207 may be operable to synchronize the central server 101, determining the date and time the central server 101 receives an account application, as well as for time related calculations in alternate embodiments described below, such as an amount of time until the expiration date of an account application. The processor 201 communicates with trader devices 103, 105, 107, 109 via the communications port 213. The communications port 213 may be implemented using a T1 communications board, a serial port and modem, a LAN adapter, infrared communication, serial connection, satellite, microwave, or any functionally equivalent processor communications system.

Data storage device 220 may be implemented using a persistent memory system which may include random access memory, hard disk drives and/or other appropriate combination of electronic or optical data recording units, which include CD-ROM drives and micro-disk drives. The processor 201 and the data storage device 220 may each be (i) located entirely within a single computer or other computing device, (ii) connected to each other by a remote communication medium, such as a serial port cable, telephone cable, telephone line or radio frequency, or (iii) a combination thereof. In one embodiment, the central server 101 may comprise one or more computers that are connected to a remote server computer for maintaining databases. In a preferred embodiment, where the processor 201 is a general purpose microprocessor, the data storage device 220 stores program 221 which includes instructions for controlling the processor 201. The processor 201 performs instructions of the program 221, and thereby operates in accordance with the present invention, and particularly in accordance with the methods described in detail herein. The program 221 may be stored in a compressed, uncompiled, and/or encrypted format. The program 221 further includes elements that may be necessary, such as an operating system, a database management system and "device drivers" for allowing the processor 201 to interface with computer peripheral devices. Appropriate device drivers and other necessary program elements are known to those skilled in the art, and need not be described in detail herein.

According to an embodiment of the present invention, the instructions of the program 221 may be read into a main memory from another computer-readable medium, such as from a ROM to RAM. Execution of sequences of the instructions in program 221 cause processor 201 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The term "computer-readable medium" as used herein refers to any medium that directly or indirectly participates in providing instructions to processor 201 for execution. Such a medium may take many forms, including but not limited to, non-volatile media, volatile media, and transmission media. Non-volatile media include, for example, optical or magnetic disks. Volatile media include dynamic random access memory (DRAM), which typically constitutes the main memory. Transmission media include coaxial cables, copper wire and fiber optics, including the wires that comprise a system bus coupled to the processor 201. Transmission media can also take the form of acoustic, electrical or electromagnetic waves, such as those generated during radio frequency (RF) and infrared (IR) data communications.

Some common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave such as electrical, electromagnetic or optical signals, or any other medium from which a computer can read.

Various forms of computer readable media may be involved in carrying one or more sequences of one or more instructions to the processor 201 for execution. The following example illustrates the transmission of computer-readable instructions via a plurality of media. The instructions may initially be stored on a magnetic disk of a remote computer. The remote computer can load the instructions into its dynamic memory and send the instructions over a telephone line using a modem. A modem local to a central controller can receive the instructions from the telephone line and use an infrared transmitter to convert the instructions into an infrared signal. An infrared detector can receive the instructions represented by the infrared signal and transmit the instructions across a system bus to processor 201. The system bus carries the instructions to a main memory, from which processor 201 retrieves and executes the instructions. The instructions received by main memory may optionally be stored elsewhere before or after execution by processor 201.

The program 221 also includes instructions for managing the communication server 101, such as determining from historical data an approximate value of an item offered for a trade. In other words, the processor 201 is operable to load and run the program 221. In the embodiment of FIG. 2, the program 221 stores data accumulated, or computed by, the processor 201 on the data storage device 220. This stored data is preferably organized and indexed in one or more related objected oriented databases 230 and 240. It will be appreciated that these databases may be organized as object oriented, relational, hierarchical file systems, database systems, or any suitable data organization scheme.

In the example embodiment illustrated in FIG. 2, the related object oriented databases include an account database 230, an event database 240, and an application database 250, although these and/or other databases may be included. Each of the databases is explained in more detail with reference to FIGS. 3–4. One of ordinary skill in the art would recognize that the databases illustrated in FIGS. 3–4 could contain any number of records and that the number of records shown is for illustrative purposes only.

In one embodiment, the communication server 101 operates as a kiosk in a retail environment. A kiosk is essentially a self-service interactive system, typically a computer system placed inside a box-like structure, or a desktop computer system for use in performing transactions and/or providing information, such as providing a layout of a shopping mall facility to the general public. The kiosk may employ a touch screen as the input device since they are easy to use. However, other input devices such as a mouse or a keyboard may also be used.

The account database 230, which may include one or more databases, as illustrated in FIGS. 3A, 3B and 3C, maintains account data obtained from the user's application, with fields 301–345. In an exemplary embodiment, account data is stored in fields 301–314, such as, an account identifier field 301, an user name field 302, a home address field 303, a business address field 304, a contact number field 305, a date of birth field 306, an alias field 307, a e-mail ("electronic mail") address field 308, a driver's license identification field 309, a country of citizenship field 310, a country of legal residence field 311, a password field (mother's maiden name) 312, and a social security number field 313.

The user's employment information is stored in fields 316–320, such as, a employment status field 316, an occupation field 317, an employer field 318, a company ownership field 319, and a security firm affiliation field 320. The user's family information is stored in fields 322–323, such as a marital status field 322 and a dependents field 323.

The user's investment profile is stored in fields 325–330, such as, an investment knowledge field 325, which stores the level of the account holder's knowledge about investing; an investment experience field 326, which stores a level of an account holder's investing experience; a tax bracket field 327, which stores the user's tax bracket; an income field 328, which stores the user's approximate annual income; a net worth field 329, which stores the user's approximate net worth; and an investment objective field 330, which stores the user's investment objective, such as capital preservation.

The user's account features are stored in fields 332–345, such as, a type of fund field 332, which stores the type of fund the user has opened, such as money market fund; and a web account access field 333, which stores the user's e-mail address. The account features also include an account funding field 334, which stores a date on which the account is funded, by how much the account is funded, and how the user funds the account. For example, the account may be funded by transferring assets from another account, with a check or money order, or with security certificates. The account features further include an electronic funds transfer field 336, which stores information regarding the type of electronic funds transfer, such as from a personal checking account, the name of the financial institution electronically transferring the funds, such as Any Bank, the account number and name on an account from which the funds are being transferred, an amount of money to be transferred from the account, the frequency and schedule with which the amount of money is to be electronically transferred.

Referring now to the account identifier field 301, this field stores an account identifier, such as an account number, for each user. In the exemplary embodiment illustrated in FIGS. 3A, 3B and 3C, five account identifiers are shown, T-1111, T-2222 and T-3333. Each account identifier has an associated name stored in name field 302. For example, Lulubelle Queeg's account identifier is T-1111, and Jim Smith's account identifier is T-2222. Home address and business address fields 303, 304, store the home address and the business address, respectively, of the user. Contact number field 305 stores contact numbers for the user, such as, business and home telephone numbers. Other numbers such as, pager, mobile and fax numbers may also be stored. Date of birth field 306 stores the user's date of birth. Alias field 307, stores an user's alias. E-mail address field 308 stores an e-mail address of the user. Driver's license field 309 stores the user's driver's license number and the state in which the driver's license was issued. Country of citizenship field 310 and country of legal residence field 311, store the country in which the user is a citizen and the country in which the user is a legal resident, respectively. Password field 312 stores the user's password, such as the user's mother's maiden name. Such passwords are used to authenticate users. Social security field 313 stores the user's social security number.

With respect to the user's employment information, the user's employment status, such as, employed or unemployed, is stored in employment status field 316. The user's occupation is stored in occupation field 317. The user's employer information, such as name, address and phone number, is stored in employer field 318. Company ownership field 319 stores information regarding the companies in which the user is a director, 10% shareholder, or policy-making officer. Security firm affiliation field 320 stores information regarding-securities-firm(s) by whom the user is employed, or in which the user is a director or owner.

With respect to the user's family information, the user's marital status is stored in marital status field 322 and number dependents is stored in dependents field 323.

With respect to the user's investment profile, the level of the user's knowledge about investing is stored in investment knowledge field 325, the user's investment experience is stored in investment experience field 326, and the user's tax bracket is stored in tax bracket field 327.

An exemplary embodiment of Integrated Customer Information ("ICI") event database 240 is illustrated in FIG. 4. The event database tracks the various stages of the process of setting up a user's account with open and closed events. The open events are waiting for a certain process. Once that process occurs, that event is closed and a new one, if appropriate, is written to indicate the new status of the account. In an exemplary embodiment, the event database 240 is basically a tracking table for the lifecycle of a user's account.

In an exemplary embodiment, the event database 240 maintains data on events with fields 241–245, such as, an account identifier field 241, an event identifier field 242, an event name field 243, an event start date field 244, and an event end date field 245.

Account identifier field 241 stores an account identifier, such as an account number, of the user's brokerage account. This is the account identifier assigned by the account database 230. Event identifier field 242 stores an event identifier for each event. Event name field 243 stores the name of an event. Exemplary events are a "series 8 review" event, which indicates that an account needs to be reviewed for compliance with Security and Exchange Commission ("SEC") rules and regulations; a "series 8 approved" event, which indicates that the account is in compliance with the SEC rules and regulations and therefore a formal application form needs to be mailed to the user; and a "series 8 denied" event, which indicates the account is not in compliance with the SEC rules and regulations, and therefore the user's account is closed. Another exemplary event is a "clock-ticking" event which gets closed once a signed account form is received from the user. If this event is still open-after a predetermined number of days, the user's account is closed. It will be appreciated that the events discussed are for exemplary purposes and that event database 240 can include other events as well. The event database 240 may include many events and many corresponding time stamps.

The event start date field 243 stores the date on which the event was written to the database 240, and the event end date field 244 stores the date on which the event was completed.

In an alternate embodiment, event database 240 includes an event status field 245, which stores a status of the event. In an exemplary embodiment, the status of an event is either open or closed. When an event is entered into the event database 240, the status of the event is indicated as open in event status field 245. When an end date is entered into the corresponding field 244, the status of the event is indicated as closed in event status field 245.

In another alternate embodiment, event database 240 includes an event action field 246 which stores an action taken on the event. In an exemplary embodiment, the action taken is approved, denied or pending. In yet another alternate embodiment, information indicating the action taken on the event is incorporated into the event identifier.

For example, as illustrated in FIG. 4, when a user's account is opened, a first open event is written to indicate that system processing needs to begin for this account, and a second open event is written to indicate that the account needs to be processed by an electronic series 8 application. The electronic series 8 application reviews the user's account information for compliance with rules and regulations of the Securities and Exchange Commission. Upon series 8 approval, the "perform series 8 review of account" event is closed because that event has been completed. In one embodiment, a new event is written to indicate that a pre-filled out new account application form should be generated and mailed to the user. In an alternate embodiment, an application is only mailed at the user's request.

Application database 240 stores one or more application programs run by the processor 201. For example, account maintenance program receives information from customer database 230 and the event database 240 and includes a list of account numbers that need to be reviewed for compliance with the rules and regulations of the Securities and Exchange Commission ("SEC"). This program communicates with the series 8 application program, which reviews a user's account application for compliance with the rules and regulations of the SEC.

Figure 5A:
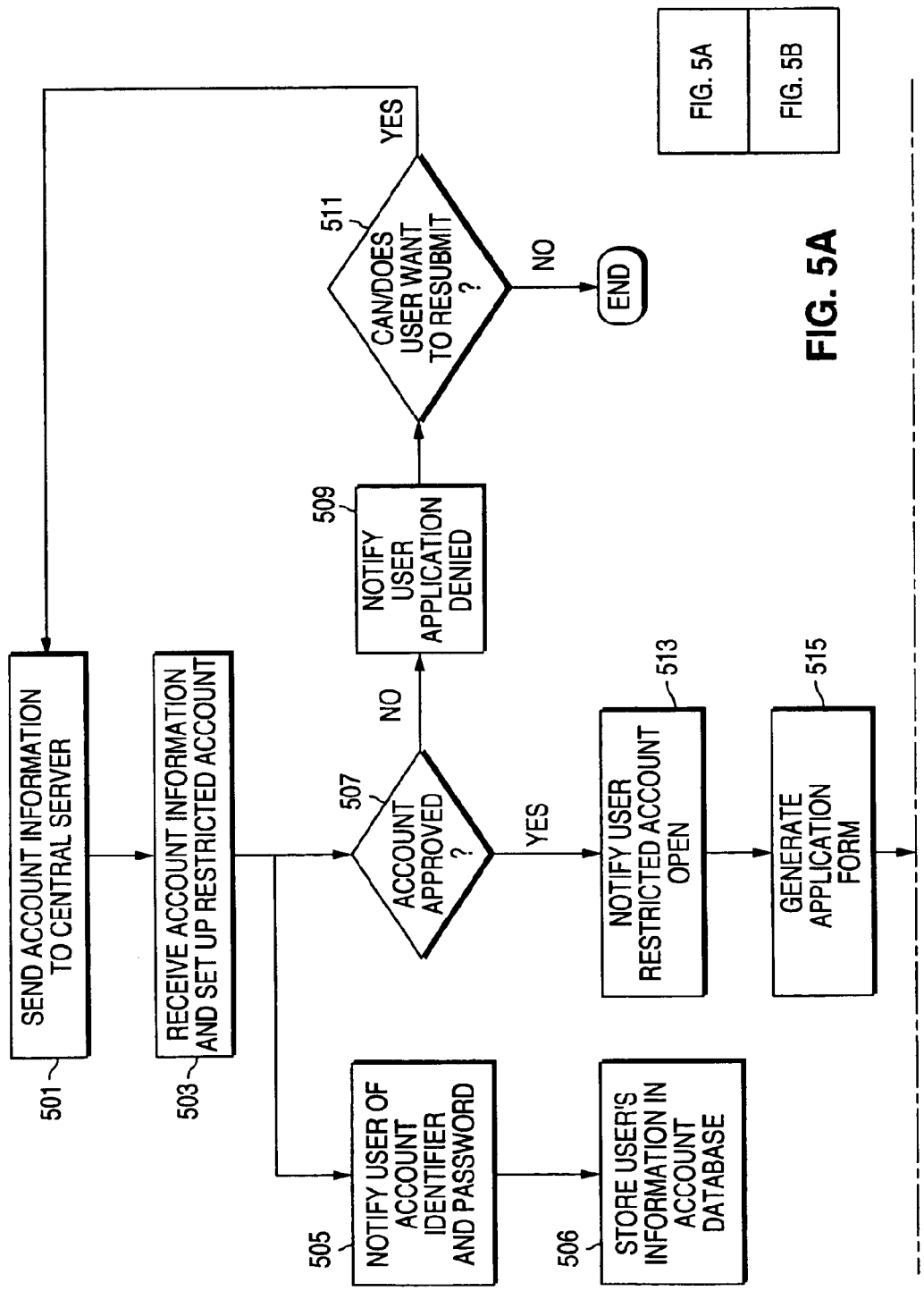
FIG. 5 is a process flowchart illustrating an example embodiment of a method of the present invention.
Figure 5B:
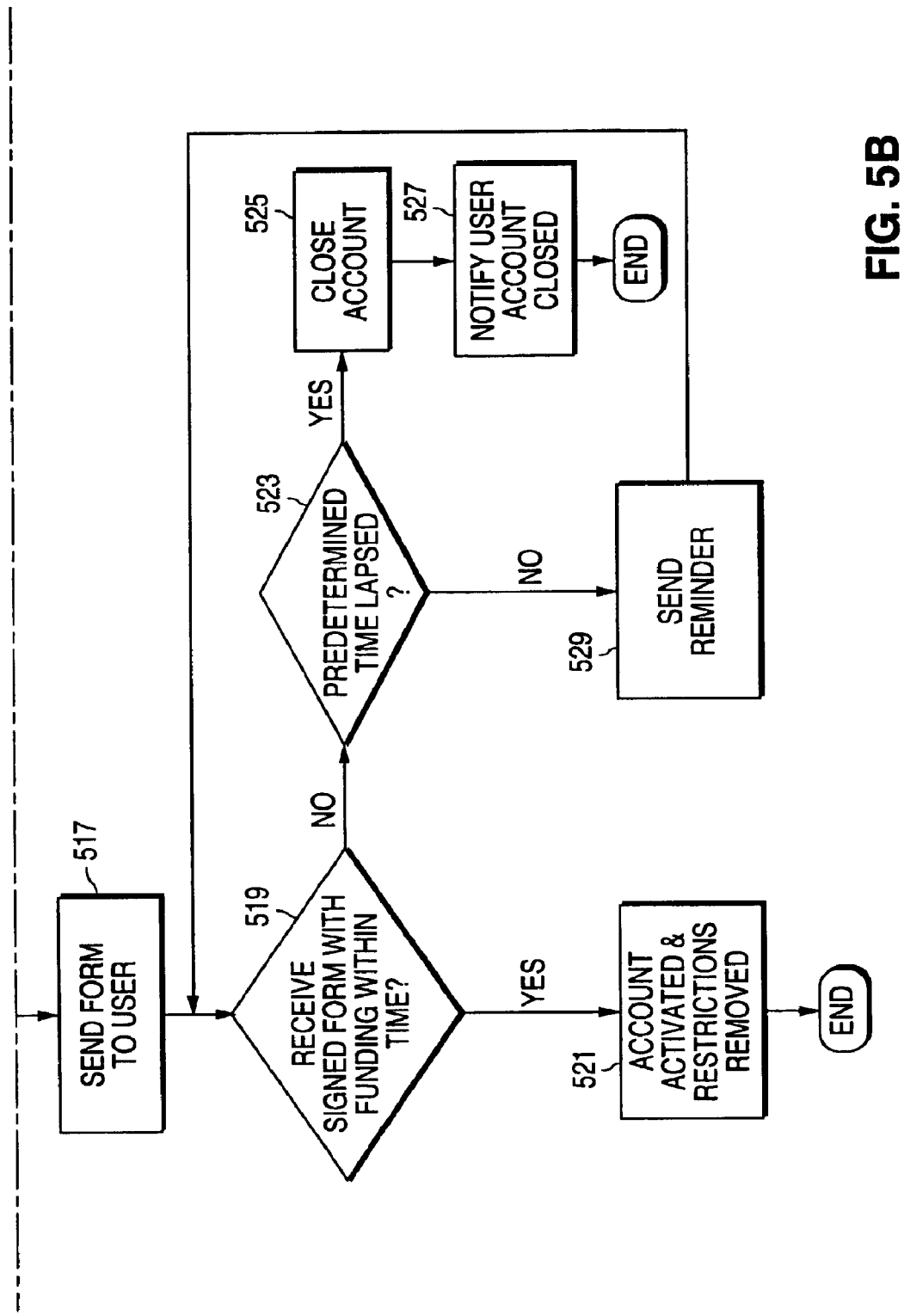

One embodiment of the operation of the system 100 is explained with reference to the flowchart illustrated in FIG. 5. At step 501, a user sends account information to central server 101. In one embodiment of the present invention, the central server 101 operates as a web server for an Internet environment. In such embodiment a user logs on to the website and completes a new customer electronic account application form that may be temporarily residing in the machine via a Java-type applet downloaded from the central server 101 or off a network such as the Internet. The electronic application form can be a document specifically prepared for publication on the web (for example, a document in Adobe's Portable Document Format (PDF)), or a document which has been printed, but converted into Hypertext Markup Language (HTML). The information provided by the user includes the information stored in fields 301–345 of account database 230, such as name, address, social security number, and date of birth.

The data input by the user is sent to the central server 101 via the Internet. Once the user has completed the electronic account application, the user submits the electronic account application to the central server 101. In an exemplary embodiment, the user can print the new customer electronic account application form from the central server 101. The user then signs the account application form, and mails it to the brokerage firm with the appropriate funding. In an alternate embodiment, the central server 101 can generate an application form based on the information provided by the user and send it to the user, as discussed more fully below with reference to optional steps 515 and 517.

Referring again to step 501, in an alternate embodiment, users can provide information to a human representative, such as a broker, associated with the system 100. Based on the information obtained from the user, the human representative completes an account application on behalf of the user and submits it to the central server 101.

In yet another embodiment, users can access the system 100 via a telephone system, such as using interactive voice response unit ("IVRU") technology. In such embodiment, using a telephone, users are prompted by an interactive voice response unit (IVRU) within the central server 101 to input account information, such as their name, address, telephone number, date of birth, driver's license identification, social security number, as well as other information stored in fields 301–345 of account database 230. For example, the IVRU may prompt the user to enter a name. Once the name is entered, the IVRU many prompt the user to enter a home address and telephone. Such an embodiment of the barter exchange server 101 affords recipients an alternate mechanism to open an account.

When the user's account application is received, at step 503 the system 100 assigns the user an account identifier and password so that the user may access the brokerage account on-line. At step 505, the system 100 notifies the user that a restricted on-line brokerage account has been open which the user may access via the web by using the assigned account identifier and password. In an exemplary embodiment, immediately after the user submits the account information the system 100 notifies the user of the assigned account identifier and password which is displayed on the website. The user can use the assigned account identifier and password to log into the secure website as a customer and access the user's personal account. In an alternate embodiment, the assigned account identifier and password are sent to the user by electronic mail ("e-mail"). However, it will be appreciated that user also may be notified by telephone, fax, and/or regular mail that the restricted account has been opened. In an exemplary embodiment, at this time, the user is able to access the central server 101 which permits the user to receive a variety of multimedia displays on the user's terminal and to perform interim activities, such as research on securities, set up watchlists which track the performance of specific securities, and other customer related activities. However, system controls are in place at the server level to prevent the user from performing certain activities, such as trading securities, funding the account, or obtaining real time quotations of securities, as long as the "restricted" status of the account is in place. It will be appreciated that these and/or other restrictions can be imposed on a user's account.

At step 506, the user's account information is stored in account database 230. Then at step 509, it is determined whether to approve the user's account application. At this step, the user's account application is reviewed for compliance with rules and regulations of the Securities and Exchange Commission. If the user's account application is denied, at step 509, the status of the event in event database 240 is updated to "denied" and the system 100 sends a notification to the user indicating that the user's account application has been denied. In one embodiment, the system 100 includes in the notification an explanation as to why the account application was denied, and indicates what information the user can provide, if any, to get the account application approved. In an alternate embodiment, the system 100 will also give the user an opportunity to resubmit the revised account application with the additional information within a predetermined time period.

At step 511, it is determined whether the user wants to resubmit the account application with the additional required information for approval. In some instances, there is no information a user can provide for the user's account application to be approved. In such instances, the process ends. However, if at step 511 the user does want to resubmit the account application, the process returns to step 501. In an alternate embodiment in which the user is given a predetermined time in which to resubmit the revised account application, the process ends if the revised account application is not received within the predetermined time.

Referring again to step 507, if the user's account application is approved, the status of the event in event database 240 is updated to "approved" and the system 100 opens a restricted account for the user. At step 513, the system assigns the user an account identifier and password so that the user may access the brokerage account on-line.

At step 515, the system generates a new application form. When the user's account is approved in step 505, a notification from event database 240 is received indicating the user's account application has been approved, and the user's account application information stored in account database 230 is obtained. In one embodiment, at this point, the pending events are closed and the user's account application is flagged as open for activity. A new event is opened to print the account application and send it to the user. Once the account application is sent, this event is closed. In an alternate embodiment, when the user's account application is approved, the user's account is opened and the user's account application is archived, rather than sent to the user.

However, if the user requests a copy of the account application, then the application can be mailed.

The system 100 processes this information and adds other information, such as money market funding information and an application agreement, and generates a new application form including all of this information. In the embodiment where the account application is sent to the user, at step 517, the system 100 sends this new application form to the user for signature and funding. In an exemplary embodiment, the user must sign and return the new application form with the appropriate funding within a predetermined time, such as 28 days, otherwise the system 100 closes the user's account. It will be appreciated that there are numerous ways in which a user may fund the account, such as by sending a personal check, wiring money from another account, or transferring assets from another account.

At step 519 it is determined whether the user has returned the signed form with funding. If the user has returned the signed form with funding, at step 521 the restrictions on the user's account are removed and the user's account is fully functional. If the user has not returned the signed form with funding, at step 523 the system 100 determines whether the predetermined time has lapsed. If the predetermined time has lapsed, at step 525 the user's account is closed. In an alternate embodiment, at step 519 it is determined the user has returned the application form without a signature, but with the funding. In such embodiment, the system 100 returns the application form and gives the user another predetermined time in which to return the application form with a signature. If the signed application form is returned within this predetermined time, the process continues to step 521.

If the signed application form is not returned within this predetermined time, at step 527, a notification is sent to the user that the account has been closed. When the user's account is closed, the user is no longer able to perform any interim activities.

Referring again to step 521, if the predetermined time has not lapsed, at step 529 a reminder is sent to the user to return the new application form with a signature and funding, and the process returns to step 519.

Figure 6A:
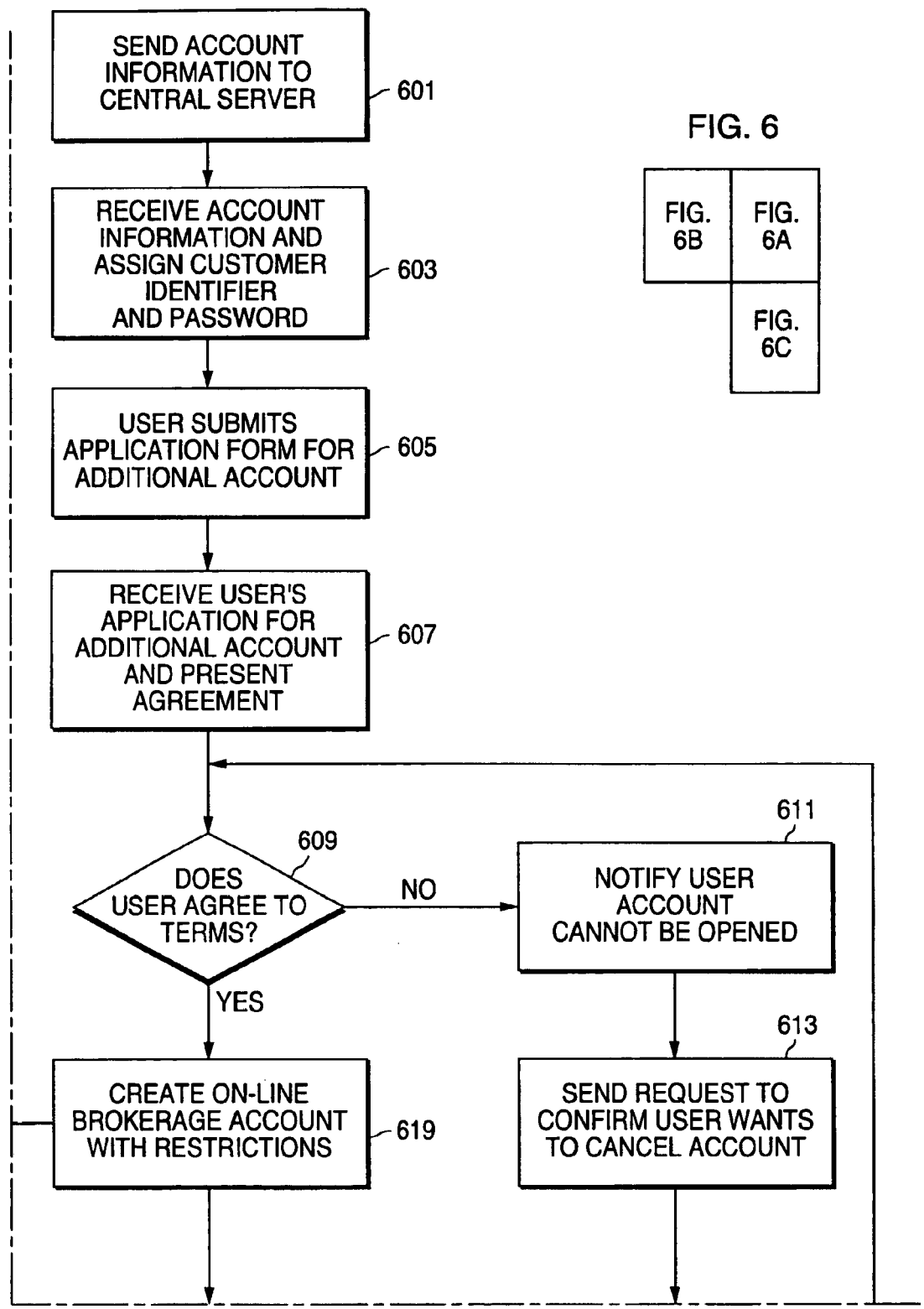
FIG. 6 is a process flowchart illustrating another example embodiment of a method of the present invention.
Figure 6B:
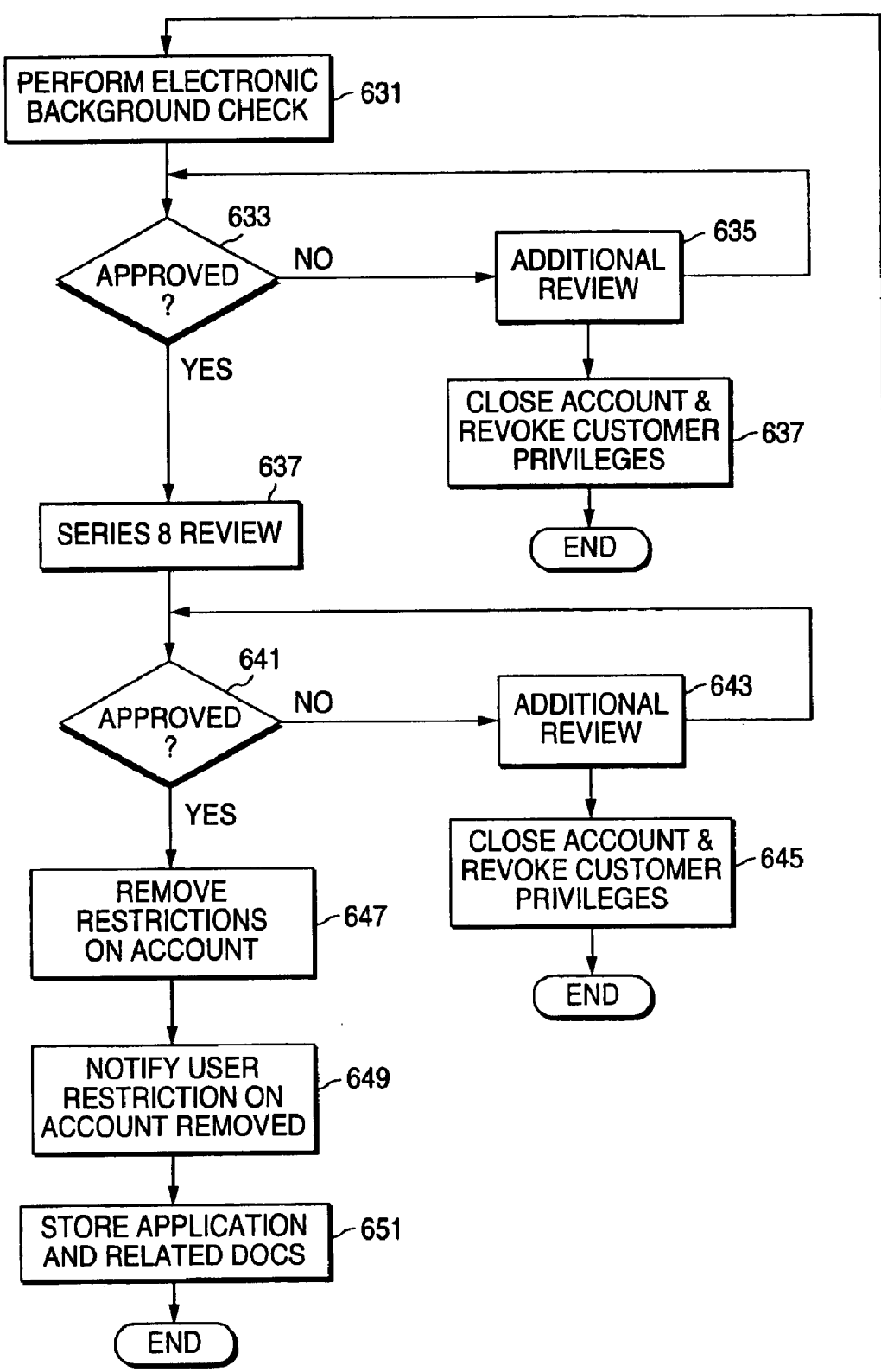
Figure 6C:
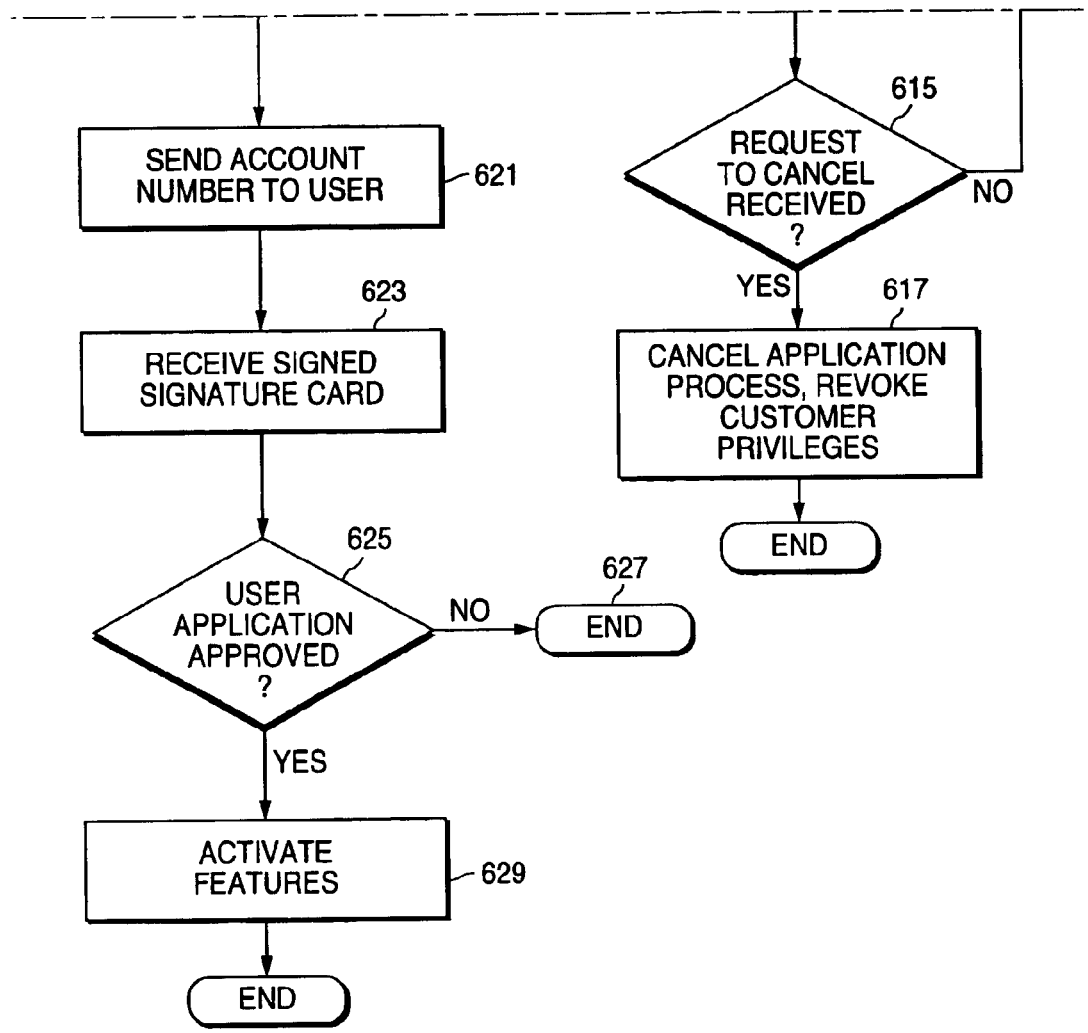

An alternate embodiment of the operation of the system 100 is explained with reference to the flowchart illustrated in FIG. 6. In this embodiment of the present invention, new customers and existing customers not having an on-line brokerage account, are able to submit a completed application including a signature and a click through agreement, to open an on-line brokerage account. Step 601 is analogous to step 501 illustrated in FIG. 5, where the new user completes a new customer application form and submits it to central server 101 operating as a web server for an Internet environment. It is not necessary for existing customers to complete this application.

When the new user's account application is received, at step 603 the system 100 assigns the new user a customer identifier and password so that the user may access the brokerage account on-line. The user is then able to log onto a secure website as a customer. The user can then select the desired electronic application form for the desired account type, such as an individual retirement account (IRA), for which the application is being made.

If the user is an existing customer, then the existing customer uses the customer identifier and password it has already been assigned to log into the secure website. The existing customer can then select an electronic application form for an additional account.

The remaining steps in the process apply to both new and existing customers. When the customer has completed the application form for the additional account, at step 605 the customer submits the application.

At step 607, the system 100 receives the completed electronic application and presents an agreement to the customer which sets forth the terms under which the account is being set up for the customer. In an exemplary embodiment, the agreement is a click-through agreement, in which the customer selects an electronic push button indicating that the customer either agrees or does not agree to the terms set forth in the agreement. To proceed with the application process, the customer must submit that the customer agrees to the terms set forth in the click-through agreement. At step 609, it is determined whether the customer agrees or disagrees to the terms set forth in the agreement.

If the customer disagrees to the terms set forth in the agreement, then at step 611 the customer is notified that the on-line brokerage account cannot be opened if the customer does not agree to the terms in the agreement. In an optional step 613, the customer is sent a request for confirmation that the customer wants to cancel the application to open the on-line brokerage account. If a request to cancel the application is received at step 615, at step 617 the on-line brokerage account application process is canceled, the customer's customer privileges are revoked, and the process ends. If the customer does not want to cancel the application to open the on-line brokerage account then the process returns to step 609 where the electronic application and agreement, the terms of which the customer must agree, are presented.

Referring again to step 609 if the customer agrees to the terms set forth in the agreement, an on-line brokerage account having one or more restrictions is created for the customer at step 619. In an exemplary embodiment, at this time, the customer is able to access the central server 101 which permits the customer to receive a variety of multimedia displays on the customer's terminal and to perform interim activities, such as research on securities, set up watchlists which track the performance of specific securities, and other customer related activities. However, system controls are in place at the server level to prevent the customer from performing certain activities, such as trading securities, funding the account, or obtaining real time quotations of securities, as long as the "restricted" status of the account remains in place. It will be appreciated that these and/or other restrictions can be imposed on a customer's account.

At step 621, an account number is sent to the customer for a personal account which the customer is able to access on-line via the Internet using the customer identifier and password already assigned.

An alternate embodiment of the present invention includes step 623. Sometimes a signature card bearing the customer's signature is required in order to activate certain features of a customer's account. In these instances, the customer can print out the signature card from the website, sign the signature card, and return it to the brokerage firm. When the signature card bearing the customer's signature is received at step 623, it is determined at step 625 whether the customer's on-line brokerage account application has been approved. If the customer's on-line brokerage account application has not been approved, the account has already been closed, so the process ends at step 627. However, if the customer's on-line brokerage account application has been approved, then at step 629, the features requiring the customer's signature are activated.

Referring again to step 619 where the account is created for the customer, particularly a new customer, the process proceeds to step 631 where an electronic background check, such as a credit check, is performed based on the information provided by the customer in the on-line brokerage account application. In an exemplary embodiment, the system 100 communicates with a third party verification system to perform this electronic background check. In this exemplary embodiment, the central server 101 is in communication with a server of the third party verification system to exchange data.

At step 633 it is determined whether the customer's application is approved based on the electronic background check. If the customer's application is not approved, the process may include an optional step 635 at which the customer's on-line brokerage account application goes through an additional review to determine whether either a normal or a restricted on-line brokerage account can be approved for the customer. The process then returns to step 633 for an approval determination. If the process does not include optional step 635, at step 637 the on-line brokerage account application is closed, the customer's customer privileges are revoked, and the process ends.

Referring again to step 633, if the customer's application is approved based on the electronic background check, the process continues to step 639. At this step, the customer's account application is reviewed for compliance with rules and regulations of the Securities and Exchange Commission. At step 641, it is determined whether to approve the customer's account application based on the account application's compliance with these rules and regulations. If the customer's account application is not in compliance, the process may include an optional step 643 at which the customer's on-line brokerage account application goes through an additional review. Such additional review may be to determine whether more information is needed to approve the customer's account application or to further evaluate whether to approve the customer's account application. The process then returns to step 641 for an approval determination. If the process does not include optional step 643, at step 645 the on-line brokerage account application is closed, the customer's customer privileges are revoked, and the process ends.

Referring again to step 641, if the customer's account application is approved, at step 647 the status of the event in event database 240 is updated to "approved" and the restrictions on the customer's on-line brokerage account are removed. At step 649, the customer is notified that the restrictions have been removed from the customer's on-line brokerage account. Thus, at this time the customer is able to trade securities. The process may also include a step 651 at which the customer's on-line brokerage account is stored in a database (not shown) in data storage device 220.

Additional embodiments and details of the present invention can be found in the attached additional figures, as described briefly in the following paragraphs.

Figure 7:
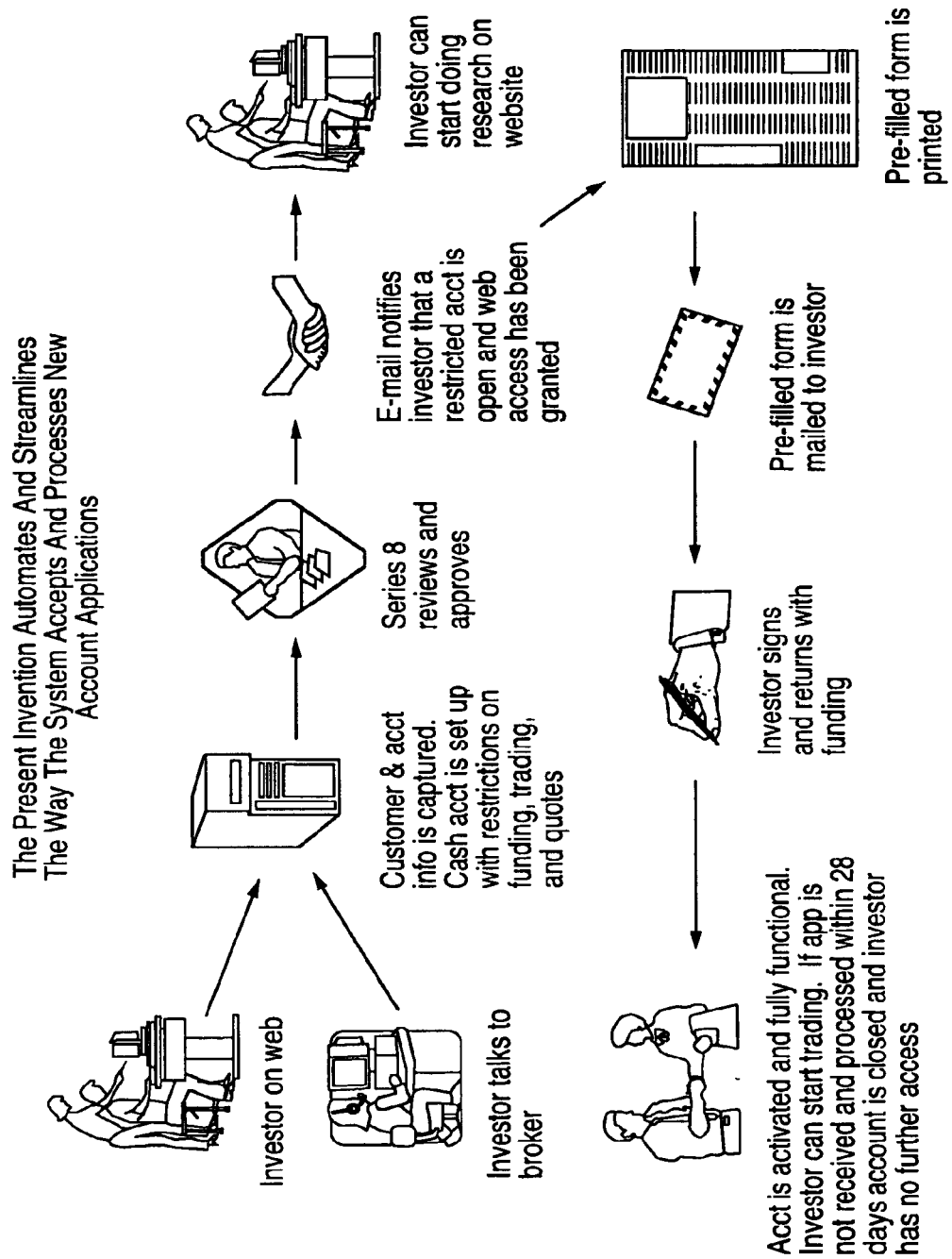
FIG. 7 is a flowchart illustrating in summary form the information flow and processing steps in an embodiment of the present invention.

FIG. 7 illustrates in summary form the information flow and processing steps involved in an embodiment of the present invention in which new account application information is processed. It is to be noted in this embodiment following the Series 8 review and approval, a restricted account is opened granting restricted rights, including the right to conduct research on the website, and the investor is informed by e-mail that the restricted account has been opened. Also notable about this embodiment is that following the opening of the restricted account, a pre-filled-in application form is mailed to the investor for signature. Once the pre-filled-in application form is signed and returned this results in a lifting of the restrictions and a transformation of the account into a fully functional account.

Figure 8:
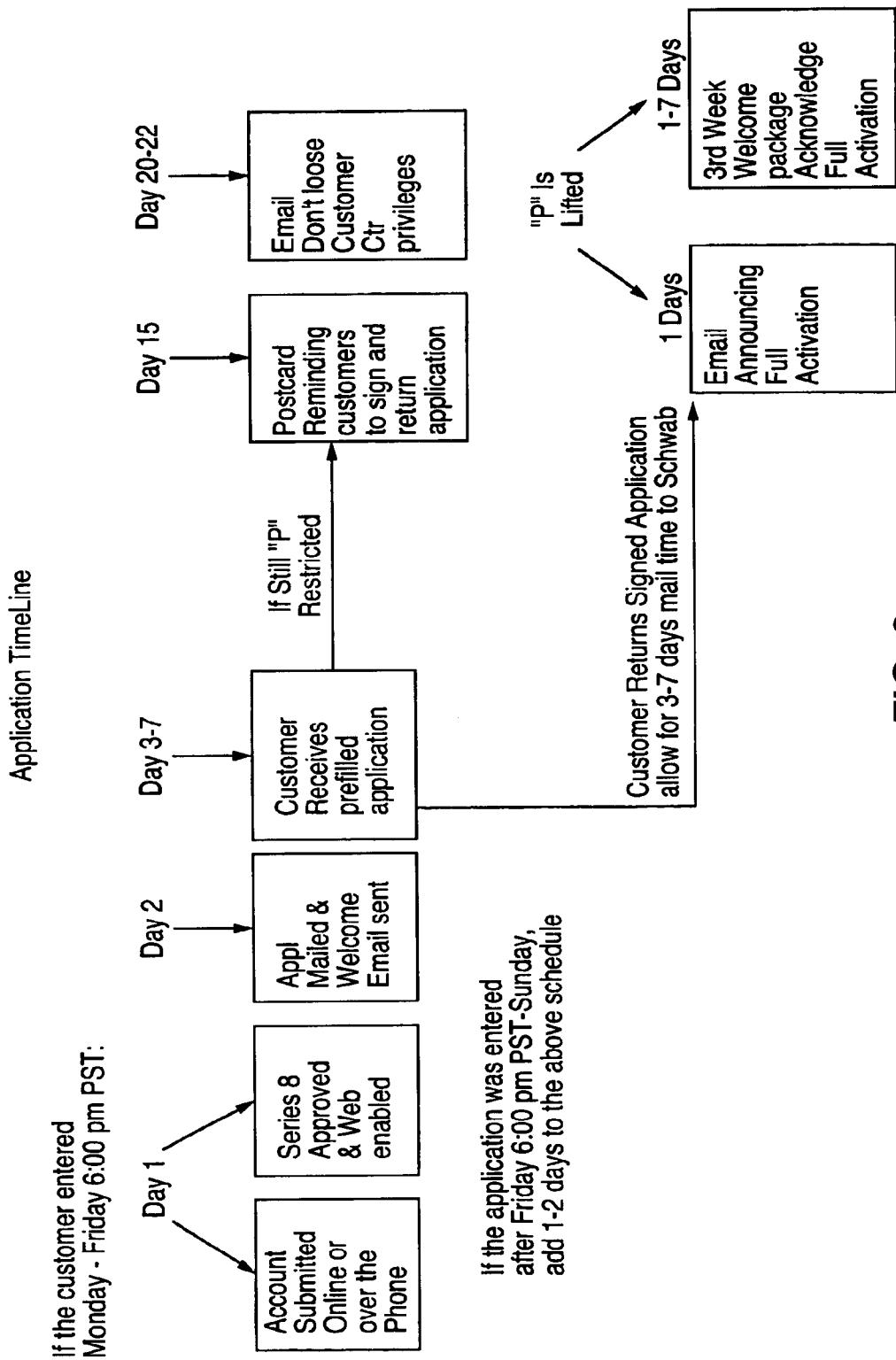
FIG. 8 is a time line illustrating the timing of various steps in an exemplary embodiment of the present invention.

FIG. 8 provides an exemplary time line which illustrates the timing of the various steps involved in receiving and processing of new account information for the embodiment of the invention of FIG. 7. As illustrated in FIG. 8, in this embodiment, as of day 2 the restricted account will have been opened, the investor will have been informed of that fact, and the investor will have been mailed the pre-filled-in application form. Within a day of receipt of the signed application returned by the investor, full activation will have occurred and the investor informed by e-mail of such fact. Also illustrated in FIG. 8 are the reminders sent to the investor at the 15 day and 20–22 day points, if a signed application has not been received from the investor by those points in time. It will be appreciated by one of ordinary skill in the art that these dates are merely exemplary.

FIG. 9 provides a summary of the rights granted in accordance with the embodiment of FIGS. 7 and 8 as a function of whether the signed application has been received.

Figure 10:
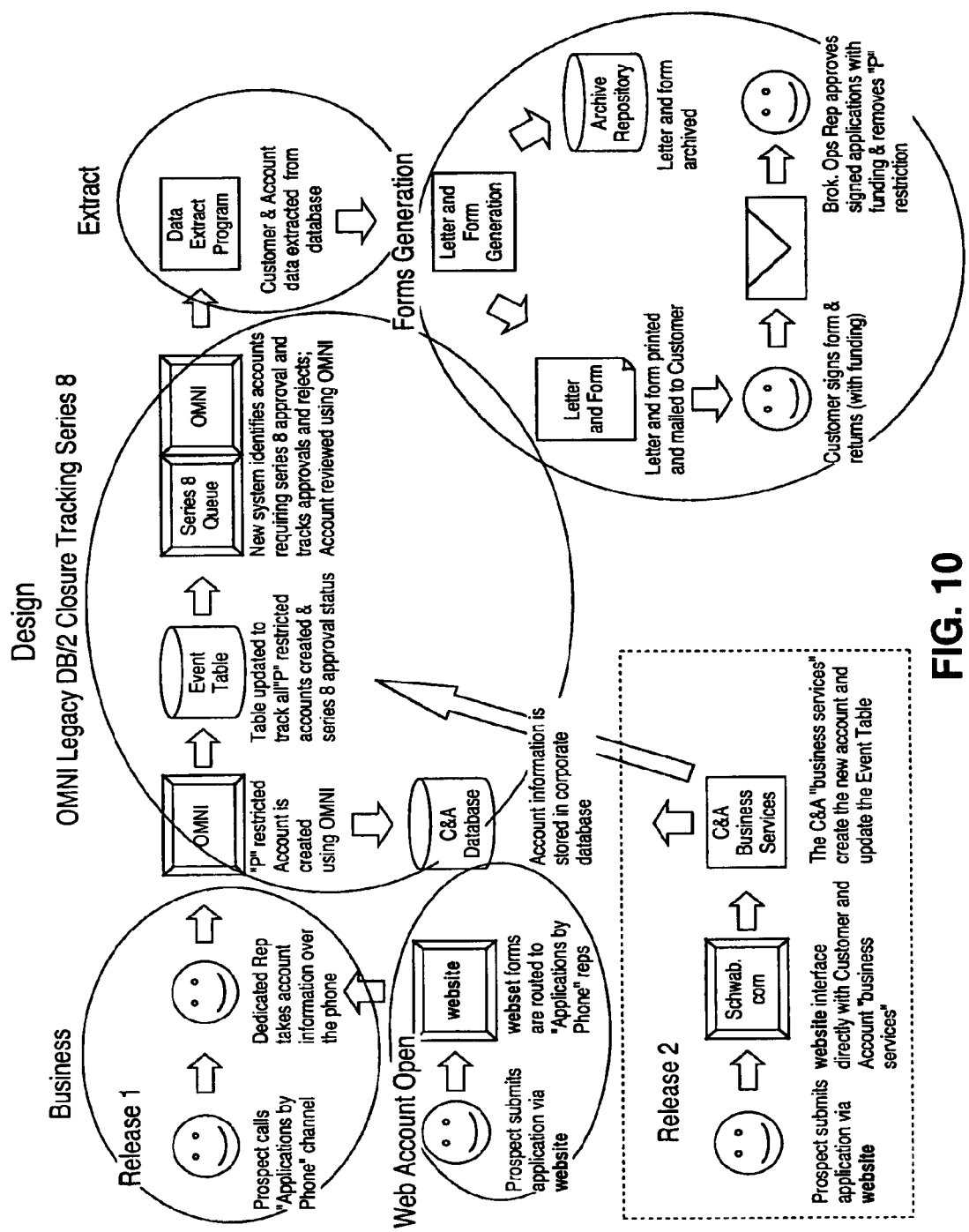
FIG. 10 is a systems diagram illustrating operational steps that occur in an exemplary embodiment of the present invention.

FIG. 10 illustrates from a systems point of view the various operational steps which occur in the present embodiment. It is to be noted that two release levels are illustrated in FIG. 10: a release 1 in which information for the new account application is received through either a phone channel or a web channel and a dedicated human representative, and a release 2 in which the human representative is bypassed. In release 2, it is the Customer and Account Business Services block which creates the new account and which updates the Event Table. Illustrated in FIG. 10 are the event table which tracks all "P" restricted accounts which have been created and their Series 8 approval status, and the Customer & Account database (C&A Database) in which the customer and account information is stored. The OMNI application provides access to the Event Table and C&A Database which are maintained in a DB2 environment. Another feature of the embodiment of FIG. 10 is the Archive Repository in which copies are kept in microfilm or microfiche form of the letter and application form that is sent to the applicant as a part of the new account application process.

Figure 11:
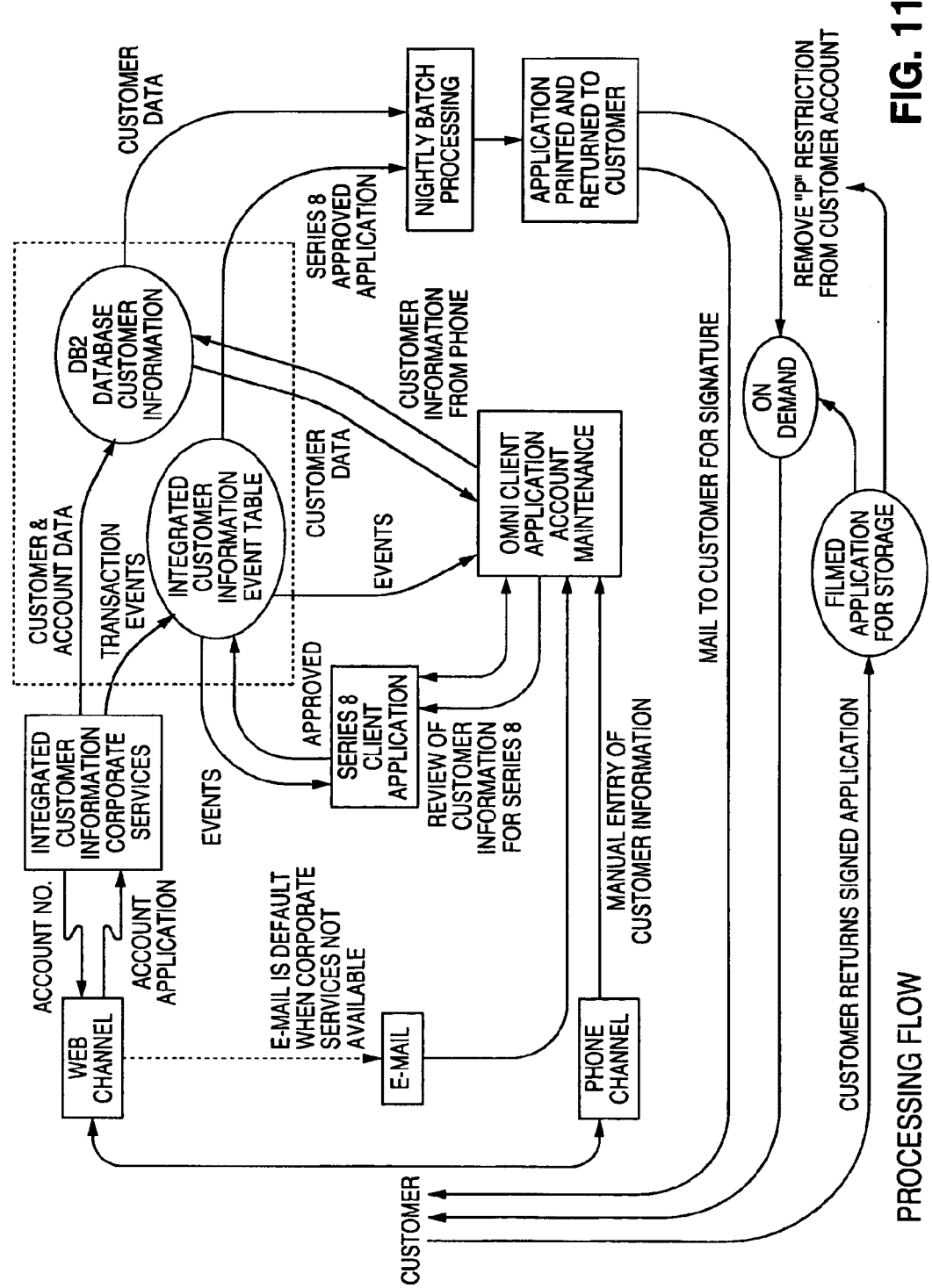
FIG. 11 is an illustration of the processing flow implementing the release 2 embodiment of FIG. 10.

FIG. 11 is an illustration of the processing flow implementing the release 2 embodiment, from an operational or functional block point of view. Illustrated in this figure is the interaction between the customer and the integrated customer information corporate services block in which account application information is received from the applicant and account number information is provided back to the applicant, both via the web channel. Also illustrated is the interaction between the OMNI Client Application Account Maintenance block, the Series 8 Client Application function, and the Integrated Customer Information Event Table. It is also to be noted that the returned signed application is filmed and stored, and then provided to the On Demand functional block for future access. FIG. 10 also illustrates that it is the receipt of the signed application which results in the removal of the restricted status over the customer account.

FIG. 12 identifies some of the features of the present embodiment. These include "System edits" which occur as a part of the interaction between the customer and the Integrated Customer Information Corporate Services block before the new account application is submitted; automated capture of required information at the point of entry; and system controls which restrict the investor activity until the signed application is received.

FIG. 13 identifies the features provided as a part of the Series 8 review beyond the conventional Series 8 type review.

FIGS. 14 and 15 list features and/or fields which are present in the Release 1 or Release 2 versions of an exemplary embodiment of the present invention in the OMNI functional block.

FIG. 16 identifies features implemented in the DB2 application in connection with an exemplary embodiment of the present invention.

FIG. 17 identifies some of the operations which occur in the Extract function shown in FIG. 10, in the Release 1 or Release 2 versions.

Figure 18:
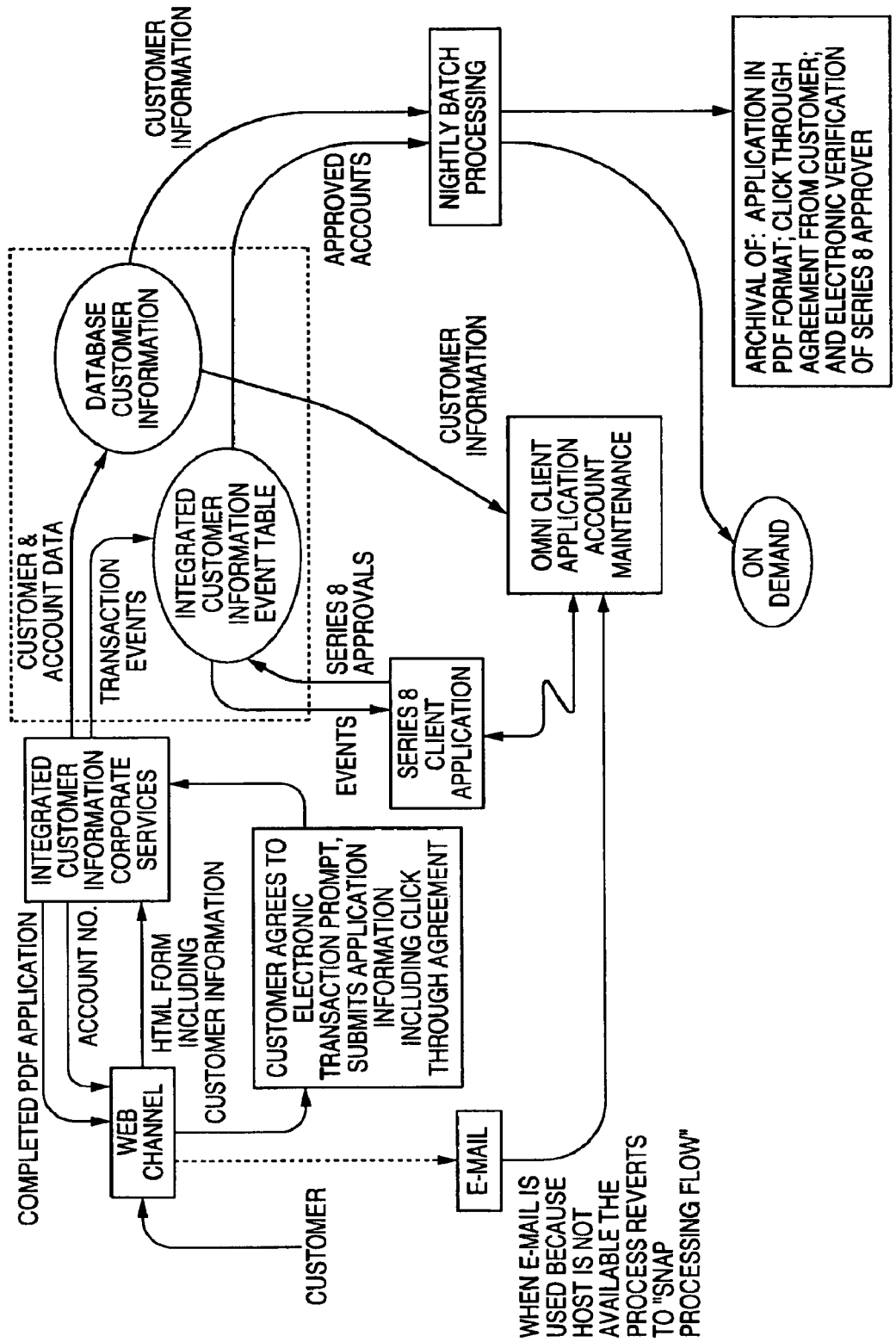
FIG. 18 illustrates a processing flow of an alternate embodiment of the present invention.

FIG. 18 illustrates a processing flow of an alternate embodiment of the present invention. This embodiment differs from the prior embodiments in a number of ways, including the use of a PDF formatted electronic form of the complete application which preserves the integrity of the content of the application as well as permits the complete application to be archived electronically. Another difference is the presentation of the completed application to the customer while the customer is on-line and in conjunction with a click-through agreement prior to presenting the application for the Series 8 review.

Figure 19:
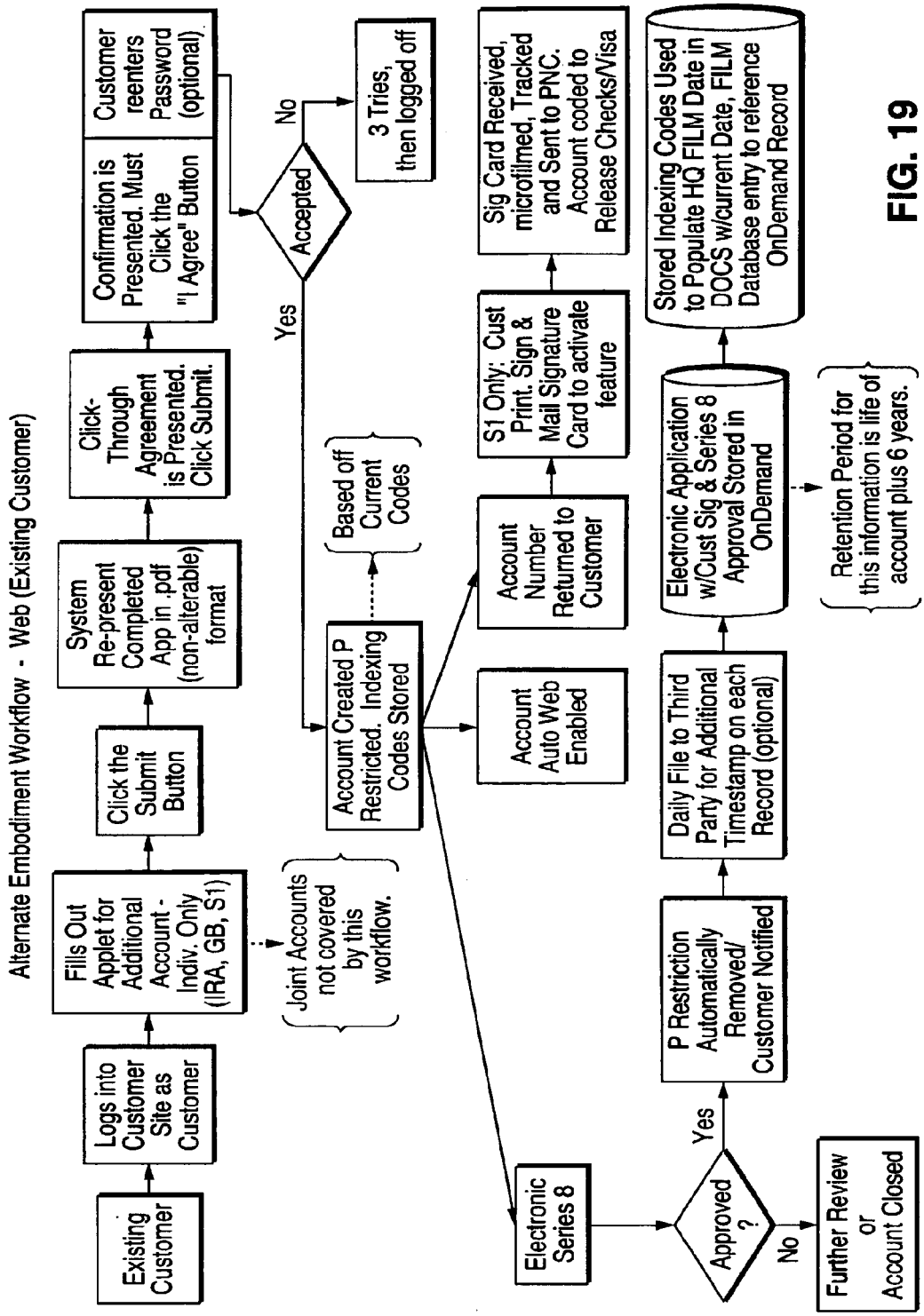
FIG. 19 illustrates an example of a work flow of the alternate embodiment of the present invention for an existing customer.

FIG. 19 illustrates an example of a work flow of this alternate embodiment for an existing customer who wishes to open an additional account. It is to be noted that an electronic Series 8 review is conducted following the initial opening of the account under a "P" type restriction, and that once approval is issued by the Series 8 review, the "P" restriction is automatically lifted. Where special accounts are involved, such as those involving the release of checks or charge accounts, a signature card will be required from the customer.

Figure 20:
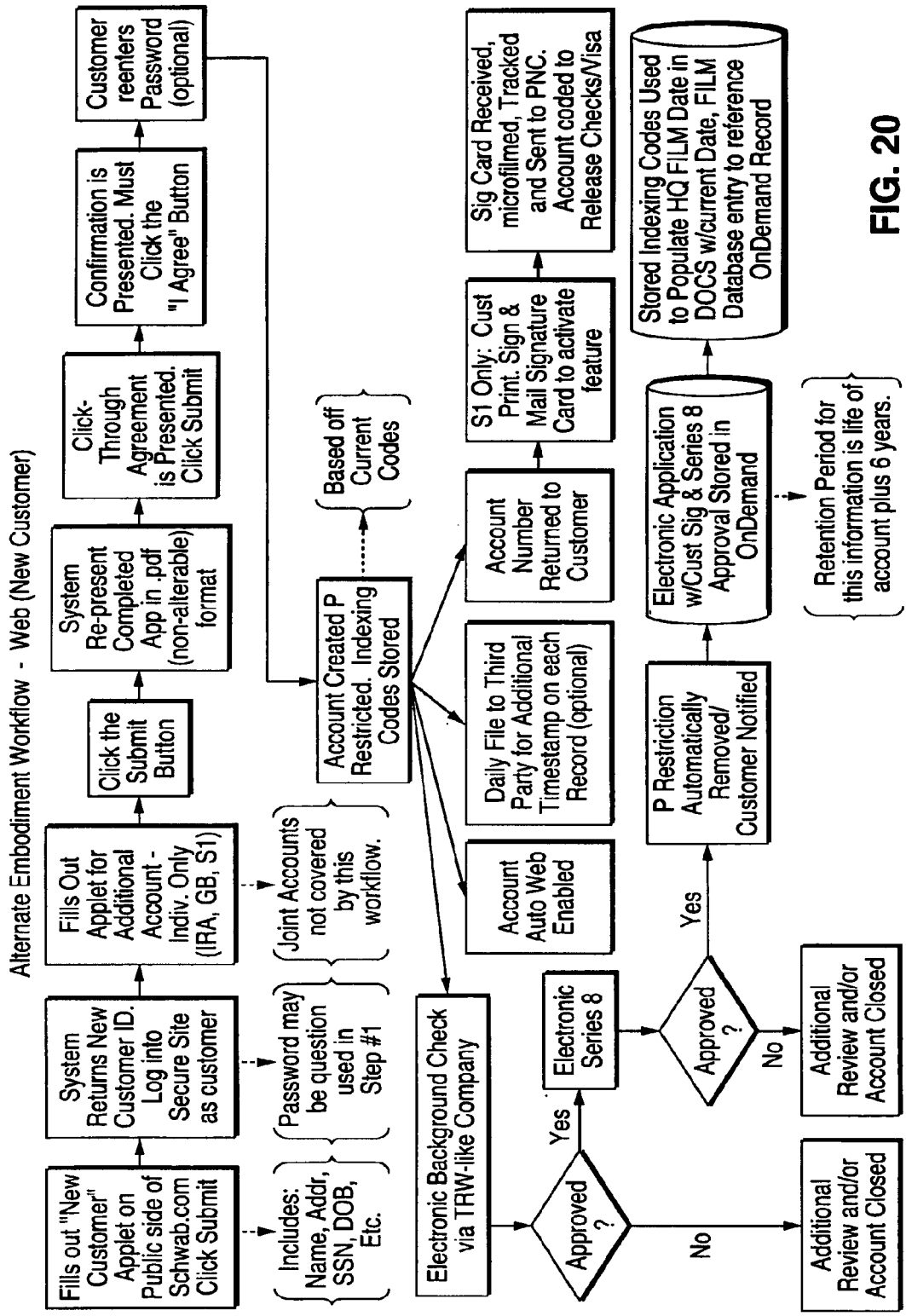
FIG. 20 illustrates an example of a work flow of the alternate embodiment of the present invention for a new customer.

FIG. 20 illustrates an example of a work flow of this embodiment for a new customer wishing to open a new account. In addition to the initial steps of establishing a new customer ID, this work flow also includes the use of an electronic background check, such as through a TRW-like or Equifax-like service, to be performed before the Series 8 review is undertaken.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly understand that many modifications are possible without departing from the teachings thereof. All such modifications are intended to be encompassed within the following claims.

What is claimed is:

1. A method for opening an on-line brokerage account, comprising:
   opening an on-line brokerage account for a user based on account information received from the user, the on-line brokerage account having one or more restrictions, wherein the account information includes at least the following the user's name, the user's social security number, the user's home address, the user's level of investment knowledge, and the user's approximate annual income;
   generating a non-alterable application based on the account information;
   electronically presenting the user with the non-alterable application, and presenting the user with a click-through agreement setting forth the terms of the on-line brokerage account;
   receiving an input from the user indicating an agreement from the user to the terms of the click-through agreement;
   wherein the opening of the on-line brokerage account is done in response to the receiving the input from the user indicating agreement with the click-through agreement, and initially the on-line brokerage account is subject to one or more restrictions;
   performing a review of the account information to determine if it complies with rules and regulations of the Securities and Exchange Commission;
   if the review of the account information determines that the account information complies with the rules and regulations of the Securities and Exchange Commission removing said one or more restrictions from the on-line brokerage account;
   assigning the user an account identifier to the on-line brokerage account;
   assigning the user a password to access the on-line brokerage account; and
   providing the user with access to on-line brokerage account prior to the removing of said one or more restrictions;
   wherein the one or more restrictions comprise one or more of preventing the user from trading securities, and preventing the user from funding the brokerage account.

2. The method of claim 1, further comprising the steps of:
   closing the on-line brokerage account if the review of the account information determines that the account information does not comply with the rules and regulations of the Securities and Exchange Commission.

3. The method of claim 1, wherein when the user accesses the brokerage account prior to the removing of the restrictions the user is provided with one or more selected features of the on-line brokerage account wherein the selected features include one or more of research on securities, and the ability to set up watchlist.

4. The method of claim 3, further comprising the step of:
   if the review of the account information determines that the account information does not comply with the rules and regulations of the Securities and Exchange Commission revoking access by the user to the one or more selected features of the on-line brokerage account; and
   notifying the user that the application to open the on-line brokerage account has been denied.

5. The method of claim 1, further comprising the step of:
   doing a background check to verify whether the account information received from the user is valid or invalid.

6. The method of claim 5, further comprising the step of:
   closing the on-line brokerage account when the account information is found to be invalid during the background check.

7. A system for opening an on-line brokerage account for a client, comprising:
   a client communication channel through which account information can be exchanged with the client; and
   a central server capable of communicating with said client communication channel and configured to receive from said client communication channel account information for an application to open the on-line brokerage account, wherein the account information includes at least the following the client's name, the client's social security number, the client's home address, the client's level of investment knowledge, and the client's approximate annual income, wherein in response to receiving the account information said central server is further configured to electronically generate and present to the client in a non-alterable format a pre-filled in application for the on-line brokerage account, and a click-through agreement setting forth the terms of the on-line brokerage account; wherein the pre-filled in application includes at least the client's name, the client's social security number, the client's home address, the client's level of investment knowledge, and the client's approximate annual income, and to open the on-line brokerage account so that the opened on-line brokerage account is initially subject to one or more restrictions, and to thereafter remove said one or more restrictions from the opened on-line brokerage account, without any further action from the client, when a formal review of the client and the application for on-line brokerage account has been favorably completed, and after it has been determined that the account information complies with rules and regulations of the Securities and Exchange Commission; and wherein said central server is further configured provide a client access to the opened on-line brokerage account prior to removing said one or more restrictions.

8. The system of claim 7 further including an electronic archive in which the non-alterable, pre-filled in application for the on-line brokerage account, the click-through agreement, and the information related to the formal review of the client and application for on-line brokerage account can be stored.

9. A method for opening an on-line brokerage account, comprising:
receiving account information from a user;
electronically presenting the user a non-alterable filled in application for the on-line brokerage account, and a click-through agreement setting forth the terms of the on-line brokerage account; and
receiving an indication that the user agrees with the click-through agreement;
opening the on-line brokerage account so that the opened on-line brokerage account is initially subject to one or more restrictions;
providing the user with access to the on-line brokerage account, while it is initially subject to one or more restrictions; and
reviewing account information, and upon a successful review of the account information removing the one or more restrictions from the on-line brokerage account; and upon an unsuccessful review closing the on-line brokerage account and terminating the user's access to the on-line brokerage account.

10. The method of claim 9, wherein the reviewing the account information includes:
performing a background check, including a credit check, based on the account information provided by the user, and if the background check is not acceptable, closing the on-line brokerage account.

11. The method of claim 9, wherein the reviewing the account information includes:
performing a background check, including a credit check, based on the account information provided by the user, and if the background check is not acceptable, closing the on-line brokerage account,
reviewing the account information, if the background check is successful, to determine if the account information complies with rules and regulations of the Securities and Exchange Commission; and
removing said one or more restrictions, if the account information is found to comply with the rules and regulations of the Securities and Exchange Commission.

12. The method of claim 9, further including electronically archiving the non-alterable, pre-filled in application for the on-line brokerage account, and the click-through agreement.

13. The method of claim 9, wherein the providing the user with access to the on-line brokerage account, while it is initially subject to one or more restrictions, includes providing the user with an account number, a customer identifier, and a password, so that the user can access the on-line account while it is initially subject to one or more restrictions.

14. The method of claim 13, wherein the when the user accesses the on-line account while it is subject to one or more restrictions, the user is prevented from trading securities in the on-line account, but the user can use the on-line brokerage account while is subject to one or more restrictions, to research different securities, and set up watchlist to track different securities.

15. The method of claim 14 further including:
notifying the user after the one or more restrictions have been removed from the on-line brokerage account, at which point the user can trade securities in the on-line brokerage account.

16. The method of claim 9 further including:
wherein the reviewing the account information includes, performing a background check, including a credit check, based on the account information provided by the user, and if the background check is not acceptable, closing the on-line brokerage account, and if the background check is successful reviewing the account information to determine if the account information complies with rules and regulations of the Securities and Exchange Commission, and if the account information is found to comply with the rules and regulations of the Securities and Exchange Commission, removing the one or more restrictions;
electronically archiving the non-alterable, pre-filled in application for the on-line brokerage account, and the click-through agreement;
wherein the providing the user with access to the on-line brokerage account, while it is initially subject to one or more restrictions, includes providing the user with an account number, a customer identifier, and a password, so that the user can access the on-line account while it is initially subject to one or more restrictions;
wherein when the user accesses the on-line account while it is subject to one or more restrictions, the user is prevented from trading securities in the on-line account, but the user can use the on-line brokerage account while is subject to one or more restrictions, to research different securities, and set up watchlist to track different securities; and notifying the user after the one or more restrictions have been removed from the on-line brokerage account, at which point the user can trade securities in the on-line brokerage account.

17. The method of claim 9, further including:

providing the on-line brokerage account with features which require a signature card, signed by the user;

providing the user with electronic access to a signature card form, so that the user can print out the signature card form;

upon receipt of the signature card activating features of the on-line account which require a signed signature card from the user.

\* \* \* \* \*